(12) United States Patent
Wirsén et al.

(10) Patent No.: US 12,514,962 B2
(45) Date of Patent: Jan. 6, 2026

(54) MEDICAL DEVICE COMPRISING A COATING FOR MITIGATION OF FORMATION AND/OR GROWTH OF BIOFILM

(71) Applicant: CYTACOAT AB, Solna (SE)

(72) Inventors: Per Wirsén, Orgeval (FR); Alan Rhodes, Wokingham (GB); Graeme Brookes, Whitchurch (GB)

(73) Assignee: CYTACOAT AB, Solna (SE)

( * ) Notice: Subject to any disclaimer, the term of this patent is extended or adjusted under 35 U.S.C. 154(b) by 0 days.

(21) Appl. No.: 18/855,589

(22) PCT Filed: Dec. 22, 2023

(86) PCT No.: PCT/EP2023/087593
§ 371 (c)(1),
(2) Date: Oct. 9, 2024

(87) PCT Pub. No.: WO2024/133882
PCT Pub. Date: Jun. 27, 2024

(65) Prior Publication Data
US 2025/0303029 A1    Oct. 2, 2025

(30) Foreign Application Priority Data
Dec. 23, 2022 (SE) .................... 2251571-2

(51) Int. Cl.
*A61L 31/10* (2006.01)
*A61L 15/22* (2006.01)
(Continued)

(52) U.S. Cl.
CPC ............... *A61L 31/10* (2013.01); *A61L 15/22* (2013.01); *A61L 27/34* (2013.01); *A61L 29/085* (2013.01); *A61M 25/0045* (2013.01)

(58) Field of Classification Search
None
See application file for complete search history.

(56) References Cited

U.S. PATENT DOCUMENTS 5,436,161 A    7/1995  Bergström et al.

FOREIGN PATENT DOCUMENTS

WO    WO-2006101438 A1 *  9/2006  .............. A61L 27/34
WO    WO-2009076413 A2 *  6/2009  .............. A61L 29/16

OTHER PUBLICATIONS

Francolini, et al., "Antifouling and antimicrobial biomaterials: an overview"; APMIS, vol. 125, pp. 392-417 (2017).
(Continued)

*Primary Examiner* — Jeffrey D Washville
(74) *Attorney, Agent, or Firm* — EVENTIDE LAW LLC

(57) ABSTRACT

The invention concerns a medical device comprising a coating, said coating comprising: polymer Z bonded to the medical device and moieties of Formula (A), wherein X is an amino group which is covalently bonded to Z or which can ionically bind to free carboxyl groups, wherein the moieties according to Formula A are present in the coating at an amount of 05-30 nmol/cm2; and wherein polymer Z comprises free carboxyl groups in an amount of 1-30 µmol/cm2.

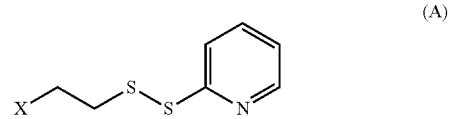

19 Claims, 9 Drawing Sheets

(51) Int. Cl.
*A61L 27/34* (2006.01)
*A61L 29/08* (2006.01)
*A61M 25/00* (2006.01)

(56) References Cited

OTHER PUBLICATIONS

Sun, et al., "Electron Beam-Induced Graft Polymerization of Acrylic Acid and Immobilization of Arginine-Glycine Acid-Containing Peptide onto Nanopatterned Polycaprolactone"; Biomacromolecules, vol. 5, pp. 2275-2280 (2004).
Li et al., "Chemical Modification of Surface Active Poly(Ethylene Oxide)-Poly(Propylene Oxide) Tri Block Copolymers", Bioconjugate Chemistry, vol. 7, No. 5, pp. 592-599 (1996).
Odeberg et al., "A novel cysteine-linked antibacterial surface coating significantly inhibits bacterial colonization of nasal silicone prongs in a phase one pre-clinical trial", Materials Science and Engineering C, vol. 93, pp. 782-789 (2018).
Search Report for Sweden Patent Application No. 2251571-2, dated Sep. 12, 2024, pp. 1-10 (English translation included).
International Search Report for International Application No. PCT/EP2023/087593, mailed Apr. 2, 2024, pp. 1-4.
Written Opinion for International Application No. PCT/EP2023/087593, mailed Apr. 2, 2024, pp. 1-8.

\* cited by examiner

MEDICAL DEVICE COMPRISING A COATING FOR MITIGATION OF FORMATION AND/OR GROWTH OF BIOFILM

TECHNICAL FIELD

The present invention concerns a medical device for the mitigation of formation and/or growth of biofilm on a surface. More specifically, the present invention concerns a medical device comprising a coating comprising 2-(pyridyl-dithio)ethylamine (PDEA) or a closely related compound covalently bonded to a polymer or non-covalently bound to the coating. The amount of covalently or non-covalently bonded PDEA in the coating may be low and yet allow for mitigating formation and/or growth of biofilm when the medical device is exposed to microorganisms such as microorganisms in the human body.

BACKGROUND

Biofilms are aggregates of microorganisms embedded in a matrix of extracellular polymeric substances that easily adhere to and grow on surfaces such as solid surfaces. The microorganisms may be different types of microorganisms such as bacteria, archaea, protozoa, fungi and algae. It has been found that the structure of the biofilm provides a natural barrier and protective layer for the microorganisms allowing them to thrive and making them more resistant to environmental stress compared to planktonic organisms which are not connected to each other. Biofilm formation thus appears to be a way for the microorganisms to survive exposure to external stresses such as UV irradiation, extreme temperatures and pH, chemicals, disinfectants, antimicrobial agents etc. However, the protection conferred to the microorganisms and the widespread occurrence of the biofilms cause problems in many sectors including the health care sector where it has been reported that biofilms are involved in 80% of chronic infections and 65% of other infections.

Biofilms are a particular concern due to their ability to tolerate or resist treatment with antimicrobials such as antibiotics making infections associated with the presence of biofilm difficult or even impossible to treat. The difficulties to treat biofilm associated infections with antibiotics has been reported to be due to e.g. poor penetration of the antibiotics into the biofilm, which may also be accompanied by poor diffusion within the biofilm, leading to low concentrations of the antibiotics so that the bacteria may survive and develop resistance. Moreover, upon incorporation into the biofilm the bacteria change so that they go from being planktonic into sessile, i.e. they go from free-living bacteria to growing in an adherent way, whereby their metabolic activity is lowered which makes them less sensitive to antibiotics. As a result, for some antibiotics the concentration required to kill bacteria embedded in a biofilm can be up to a thousand times higher than the concentration required for killing planktonic bacteria.

Therefore, biofilm formation is an important cause of antibiotic resistance. As antibiotics are one of the most essential tools for treating bacterial infections and diseases this means reduced ability to treat patients adequately thereby leading to increased morbidity and mortality. Sadly, antimicrobial resistance has been rising for many years and is recognised as one of the top ten global health challenges by the World Health organization (WHO).

Formation and growth of biofilms frequently occur on surfaces of medical devices used in modern medicine. The biofilms may form both on intermittent and indwelling medical devices such as implants, catheters and the like. For example, catheter-associated urinary tract infections-so called CAUTIs—are one of the most common healthcare-associated infections which affects a large number of hospitalized patients having a urinary catheter. Given the wide use of medical devices this poses a big problem to the healthcare sector in terms of both human suffering and economic pressure. Therefore, measures to prevent the formation and growth of biofilm has attracted considerable interest and effort.

During the past years a large number of coating materials for altering the surface in order to minimize adherence of bacteria and biofilm has been developed. For instance, antimicrobials such as small molecules, silver ions and nanoparticles have been included in the coatings.

WO 2006/101438 discloses an antimicrobial agent comprising a cysteine compound covalently bonded to a substrate, in particular, by binding through a S—S spacer molecule to the substrate. It is described that the agent has excellent antimicrobial properties and can be used to coat surfaces or substrates of various devices such as medical devices in order to mitigate accumulation and/or growth and/or proliferation and/or the viability of microorganisms and/or formation of biofilm. It is stated in example 16 that the presence of the cys-component is essential for the antibacterial effect. Odeberg et al. (A novel cysteine-linked antibacterial surface coating significantly inhibits bacterial colonization of nasal silicone prongs in a phase one preclinical trial. Mater Sci Eng C Mater Biol Appl 2018 Dec. 1; 93:782-789) disclose a phase 1 first-in-human trial of cysteine compound coated nasal prongs made with the method disclosed in WO 2006/101438.

While many coatings have proven effective there is still a need for improved coatings such as coatings preventing formation and/or growth of biofilm upon exposure to microorganism during several days or longer. It is an object of the present invention to overcome or at least mitigate some of the problems associated with known coatings. Further, it is an object of the present invention to provide aspects and/or advantages not provided by hitherto known technique.

SUMMARY

The present invention is based on the unexpected discovery that a coating comprising a polymer comprising free carboxyl groups together with amount concentration of moieties of Formula A

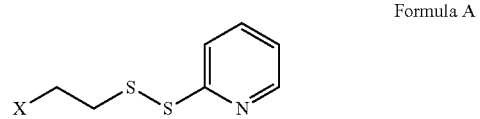

Formula A provides a hitherto undiscovered antibiofilm effect. The novel effect does not rely on inhibition of the growth of micro-organisms on the coating yet prevents the formation of a biofilm on the coated surface, which is advantageous particularly from a regulatory perspective (see Example 8). Preparation and characterization of the coating is shown in Examples 1-3. Example 4 demonstrates that the coated surface is not cytotoxic. The amount of Formula A according to the invention is significantly lower than in previous technology, as shown in Example 5 and Reference Example 6. The dose-response of antibiofilm activity (versus growth inhibition) is further demonstrated in Example 7.

The present invention relates particularly to the following items. The subject matter disclosed in the items below should be regarded disclosed in the same manner as if the subject matter were disclosed in patent claims.

1. A medical device comprising a coating, said coating comprising:
   polymer Z bonded to the medical device
   and moieties of Formula A

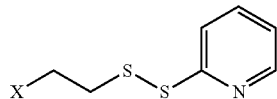

Formula A wherein X is an amino group which is covalently bonded to Z or which can ionically bind to free carboxyl groups;
   wherein the moieties according to Formula A are present in the coating at an amount of 0.5-30 nmol/cm$^2$; and
   wherein polymer Z comprises free carboxyl groups in an amount of 1-30 µmol/cm$^2$.

2. The medical device according to any one of the preceding items, wherein the coating comprises the structure of Formula I:

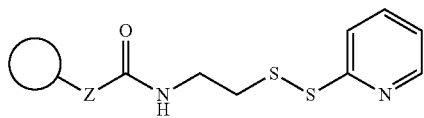

(I)

wherein the circle represents the surface of the medical device.

3. The medical device according to any one of the preceding items, wherein the coating comprises moieties of Formula A wherein X is a primary amino group —NH$_2$, a secondary amino group —NRH, or a tertiary amino group —NR$_2$, wherein each R is independently selected from C$_{1-4}$ alkyl.

4. The medical device according to any one of the preceding items, wherein the coating comprises the structure:

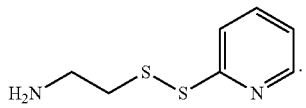

5. The medical device according to any one of the preceding items, wherein at least 20 mol. % of the moieties according to Formula A are attached to Z via a covalent bond.

6. The medical device according to any one of the preceding items, wherein at least 20 mol. % of the moieties according to Formula A are associated ionically with the coating.

7. The medical device according to any one of the preceding items, wherein the moieties according to Formula A are present in an amount of 0.5-15 nmol/cm$^2$ in the coating.

8. The medical device according to any one of the preceding items, wherein polymer Z comprises free carboxyl groups in an amount of 3-7 µmol/cm$^2$.

9. The medical device according to any of the preceding items, said coating comprising
   2-(pyridyldithio)ethylamine (PDEA) covalently bonded to a polymer, said polymer being covalently bonded to the medical device
   wherein
   the PDEA is present in an amount of from 0.001 wt % to 1 wt % based on the total weight of the coating.

10. The medical device according to item 9, wherein the PDEA is present in an amount from 0.01 wt % to 1 wt % based on the total weight of the coating.

11. The medical device according to any one of the preceding items, wherein the polymer Z is covalently bonded to the medical device.

12. The medical device according to any one of the preceding items, wherein the coating comprises a polymer selected from the group consisting of polyacrylic acid, polymethacrylic acid, poly-4-vinylbenzoic acid, polyitaconic acid, any combination(s) of the foregoing and esters or amides thereof.

13. The medical device according to any one of the preceding items, wherein the polymer Z comprises an acrylate polymer or an acrylic polymer such as polyacrylic acid.

14. The medical device according to any one of the preceding items, wherein the polymer Z of the coating is grafted from the medical device.

15. The medical device according to any one of the preceding items, wherein the coating comprises water thereby forming a hydrogel.

16. The medical device according to any one of the preceding items, wherein the medical device is selected from the group consisting of a catheter, implant, tracheal tube, stent, ventilator, wound dressing, face mask, nasal prong, hearing aid and syringe.

17. The medical device according to any one of the preceding items, wherein the medical device is selected from the group consisting of a central venous catheter, ureteral stent, wound dressing(s), ventilator, face mask, nasal prong and implant.

18. The medical device according to any one of the preceding items, wherein the medical device is a catheter, such as a Foley catheter, or an endotracheal tube.

19. The medical device according to any one of the preceding items, wherein the medical device comprises a polymer such as a thermoplastic and/or thermoset polymer, and/or a metal.

20. The medical device according to item 19, wherein
    the polymer comprises one or more of the following: silicone, polyethylene, polypropylene, polyurethane, polyvinyl chloride, polycaprolactone, polycarbonate, rubber such as latex rubber, polyether ether ketone (PEEK)
    and/or
    the metal comprises one or more of the following: steel such as stainless steel, alloy such as cobalt-based alloy or nitinol, titanium.

21. The medical device according to any one of the preceding items, wherein the coating is present on at least part of an inner surface and/or an outer surface of the medical device.

22. The medical device according to any one of the preceding items, wherein the medical device is free or substantially free from biofilm after 4 days or more, such as 30 days of clinical use.
23. A coating for a medical device, wherein the coating is as defined in any one of the preceding items.
24. Use of a coating for mitigating formation and/or growth of biofilm on a medical device surface, said coating comprising:
polymer Z bonded to the medical device and moieties of Formula A

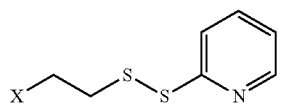

Formula A wherein X is an amino group which is covalently bonded to Z or which can ionically bind to free carboxyl groups; and
wherein polymer Z is capable of forming a hydrogel when contacted with a fluid containing water.
25. The use according to item 24, wherein the polymer Z is covalently bonded to the medical device.
26. The use according to item 24 or 25, wherein Z comprises free carboxyl groups.
27. The use according to item 26, wherein Z comprises free carboxyl groups in an amount of 1-30 μmol/cm².
28. The use according to item 27, wherein Z comprises free carboxyl groups in an amount of 3-20 μmol/cm².
29. The use according to any of items 24-28, wherein the coating comprises the structure of Formula I:

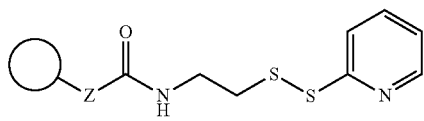

(I)

wherein the circle represents the medical device surface.
30. The use according to any of items 24-29, wherein the coating comprises moieties of Formula A wherein X is a primary amino group —NH₂, a secondary amino group —NRH, or a tertiary amino group —NR₂, wherein each R is independently selected from $C_{1-4}$ alkyl.
31. The use according to any of items 24-30, wherein the coating comprises the structure:

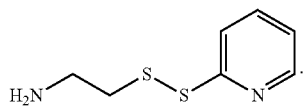

32. The use according to any of items 24-31, wherein at least 20 mol. % of the moieties according to Formula A are attached to Z via a covalent bond.
33. The use according to any of items 24-32, wherein at least 20 mol. % of the moieties according to Formula A are associated ionically with the coating.
34. The use according to any one of items 24-33 wherein the moieties according to Formula A are present in the coating at an amount of 0.5-30 nmol/cm².

35. The use according to item 34, wherein the moieties according to Formula A are present in the coating at an amount of 0.5-15 nmol/cm².
36. The use according to any one of items 24-35, wherein the coating comprises a polymer selected from the group consisting of polyacrylic acid, polymethacrylic acid, poly-4-vinylbenzoic acid, polyitaconic acid, any combination(s) of the foregoing and esters or amides thereof.
37. The use according to any one of items 24-36, wherein the polymer Z comprises an acrylate polymer or an acrylic polymer such as polyacrylic acid.
38. The use according to any one of items 24-37, wherein the polymer Z of the coating is grafted from the medical device.
39. The use according to any one of items 24-38, wherein the coating is as defined in any one of items 1-22.
40. The use according to any one of items 24-39, wherein the mitigation does not involve a bactericidal or bacteriostatic effect.

The arrangement of the present disclosure into sections with headings and subheadings is merely to improve legibility and is not to be interpreted limiting in any way, in particular, the division does not in any way preclude or limit combining features under different headings and subheadings with each other. All references are hereby incorporated by reference.

DESCRIPTION

Medical Device Comprising a Coating

Figure 1:
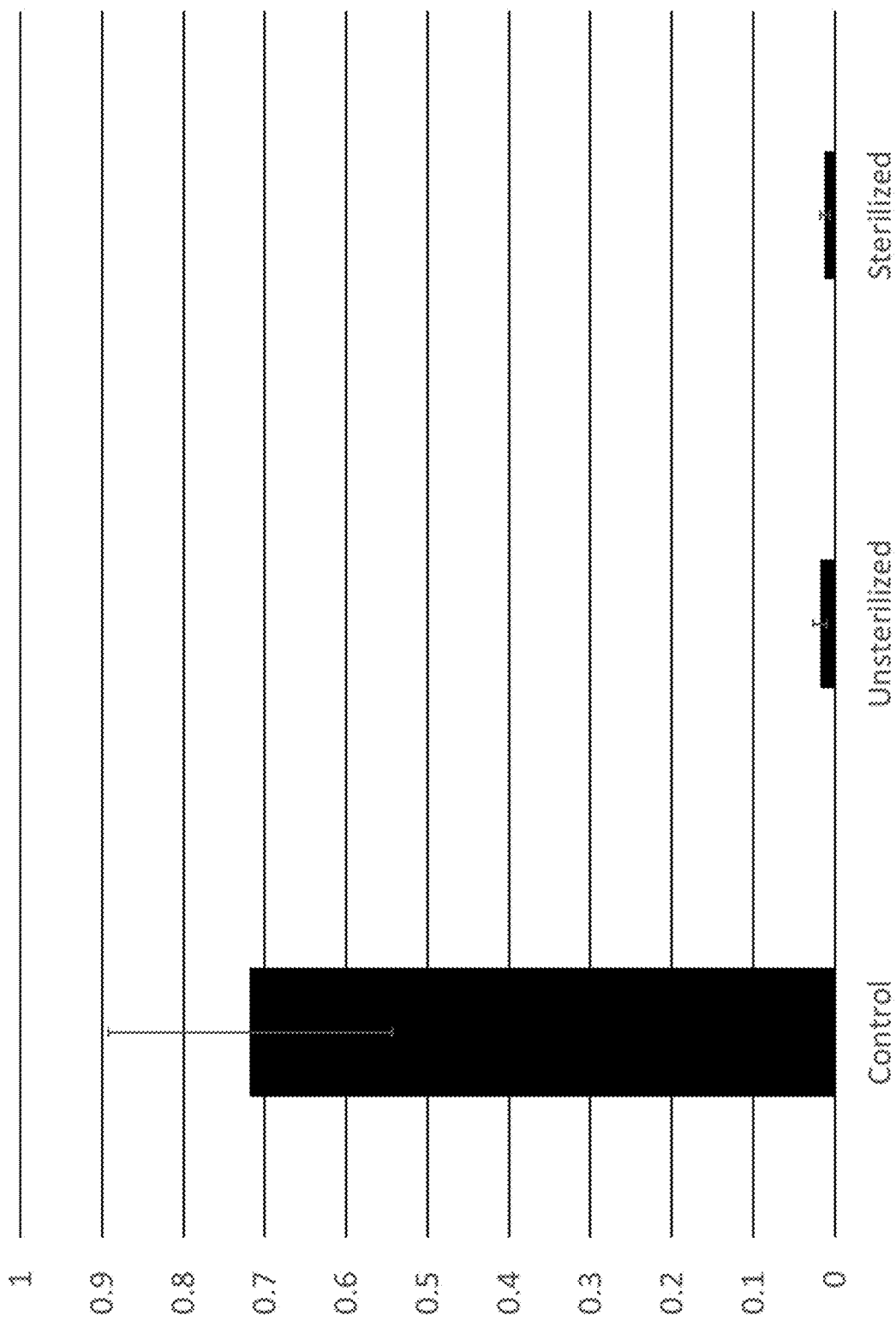
FIG. 1 shows the optical density (OD) measured at a wavelength of 595 nm for three catheter samples as described in Example 2. The OD is correlated with the EPS matrix and the embedded number of bacteria, indicating that the inventive coating results in almost complete inhibition of biofilm formation.

In a first aspect, the present invention provides a medical device comprising a coating, said coating comprising:
polymer Z bonded to the medical device (preferably covalently bonded) and moieties of Formula A

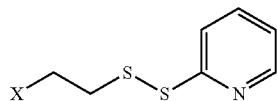

Formula A wherein X is an amino group which is covalently bonded to Z or which can ionically bind to free carboxyl groups;
wherein the moieties according to Formula A are present in the coating at an amount of about 0.5-30 nmol/cm$^2$; and
wherein polymer Z comprises free carboxyl groups in an amount of about 1-30 µmol/cm$^2$.

The present invention may also concern a medical device comprising a coating, said coating comprising polymer Z bonded to the medical device (preferably covalently bonded), and a disulfide compound of Formula (I) as defined in WO2023/012305 (herein incorporated in its entirety), covalently or non-covalently associated with the polymer, wherein polymer Z preferably comprises free carboxyl groups in an amount of about 1-30 µmol/cm$^2$. The disulfide compounds disclosed in claim 10, 11 or 12 of WO2023/012305 are particularly preferred.

X may be a primary amino group —NH$_2$, a secondary amino group —NRH, or a tertiary amino group —NR$_2$, wherein each R is independently selected from C$_{1-4}$ alkyl. Examples of C$_{1-4}$ alkyl include methyl, ethyl, n-propyl, isopropyl, n-butyl, isobutyl, sec-butyl and tert-butyl. In some embodiments, X is a primary amino group —NH$_2$.

X may be covalently bonded to Z at terminal functional groups and/or to functional groups along the polymer backbone. Examples of such functional groups include carboxy. Alternatively, X may ionically bind to terminal free groups or to free groups along the polymer backbone (e.g. carboxyl groups). For instance, when X is a primary amino group —NH$_2$, and the polymer comprises —COOH groups, said groups carry opposite charges (—NH$_3^+$, —COO$^-$) at a broad range of pH values around neutral, and consequently can associate ionically. Similarly, a secondary amino group —NRH can ionically bind to —COO$^-$ in its protonated form —NRH$_2^+$, and a tertiary amino group —NR$_2$ can ionically bind to —COO$^-$ in its protonated form —NR$_2$H$^+$.

The coating may comprise the structure of Formula I:

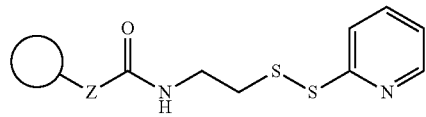

(I)

wherein the circle represents the surface of the medical device. The coating may additionally or alternatively comprise moieties of Formula A wherein X is an amino group, as defined above. In some embodiments, the coating comprises the structure:

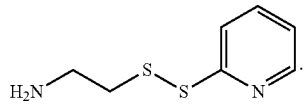

At least about 1 mol. % of the moieties according to Formula A may be attached to Z via a covalent bond, or in an increasing order of preference: at least about 2, 5, 10, 20, 30, 40, 50, 60, 70, 80, 90 or 100 mol. %, such as 2-100, 5-100, 10-100, 30-100, 50-100, 80-100, 2-90, 5-90, 10-90, 20-90, 30-90, 50-90, 80-90, 2-70, 5-70, 10-70, 30-70, 50-70, 20-80, 30-90, 40-80 mol. %. At least 1 mol. % of the moieties according to Formula A may be ionically associated with the coating, or in an increasing order of preference: at least about 2, 5, 10, 20, 30, 40, 50, 60, 70, 80, 90 or 100 mol. %, such as 2-100, 5-100, 10-100, 30-100, 50-100, 80-100, 2-90, 5-90, 10-90, 20-90, 30-90, 50-90, 80-90, 2-70, 5-70, 10-70, 30-70, 50-70, 20-80, 30-90, 40-80 mol. %. To be clear, it is possible that both covalently bonded and ionically associated moieties are present at the same time.

The moieties according to Formula A may be present in an amount of about 0.5-15 nmol/cm$^2$ in the coating. In certain embodiments, the moieties according to Formula A may be present in an amount of about 0.5-12 nmol/cm$^2$, about 0.5-10 nmol/cm$^2$, about 0.5-9 nmol/cm$^2$, about 0.5-8 nmol/cm$^2$, about 0.5-7 nmol/cm$^2$, about 0.5-6 nmol/cm$^2$, about 0.5-5 nmol/cm$^2$, about 0.5-4 nmol/cm$^2$, about 0.5-3 nmol/cm$^2$. about 0.5-2 nmol/cm$^2$ about 0.5-1 nmol/cm$^2$, about 1-12 nmol/cm$^2$, about 1-10 nmol/cm$^2$, about 1-9 nmol/cm$^2$, about 1-8 nmol/cm$^2$, about 1-7 nmol/cm$^2$, about 1-6 nmol/cm$^2$, about 1-5 nmol/cm$^2$, about 1-4 nmol/cm$^2$, about 1-3 nmol/cm$^2$, about 1-2 nmol/cm$^2$, or about 1 nmol/cm$^2$.

The polymer Z may preferably comprise free carboxyl groups in an amount of which is at least 3 µmol/cm$^2$, such as about 3-20 µmol/cm$^2$. In certain embodiments, the surface concentration of the carboxylic acid groups may be about 1-20 mmol/cm$^2$ about 1-15 mmol/cm$^2$, about 1-10 mmol/cm$^2$, about 1-7 mmol/cm$^2$ or about 1-5 mmol/cm$^2$. The surface concentration of the carboxylic acid groups of about 3-7 mmol/cm$^2$ is most preferred.

In a set of alternative embodiments of the first aspect, the present invention provides a medical device comprising a coating, said coating comprising
2-(pyridyldithio)ethylamine (PDEA) covalently bonded to a polymer, said polymer being covalently bonded to the medical device
wherein
the PDEA is present in an amount of from 0.001 wt % to 35 wt % based on the total weight of the coating.

The PDEA may be present in an amount from about 0.001 wt % to about 35 wt %, such as from about 0.001 wt % to about 30 wt %, from about 0.001 wt % to about 25 wt %, from about 0.001 wt % to about 20 wt %, from about 0.001 wt % to about 15 wt %, from about 0.001 wt % to about 10 wt %, from about 0.001 wt % to about 5 wt %, from 0.001 wt % to about 3 wt %, from 0.001 wt % to about 2 wt %, from about 0.001 wt % to about 1 wt %, from 0.001 wt % to about 0.5 wt % based on the total weight of the coating. For example, the PDEA may be present in an amount from about 0.001 wt % to about 2 wt % or from about 0.001 wt % to about 1 wt % based on the total weight of the coating. In a further example, the amount of PDEA may be from about 0.5 wt % to about 2 wt % such as from about 0.5 wt % to about 1.5 wt % based on the total weight of the coating. In still a further example, the amount of PDEA may be from about 0.001 wt % to about 1 wt %, from 0.01 wt % to 1 wt %, from 0.05 wt % to 1 wt %, from 0.08 wt % to 1 wt % or from 0.1 wt % to 1 wt % based on the total weight of the coating.

It will be appreciated that the compound 2-(pyridyldithio) ethylamine may be abbreviated as PDEA. Further, the chemical structure of 2-(pyridyldithio)ethylamine (PDEA) may be depicted as shown below. In this document, the chemical name for 2-(pyridyldithio)ethylamine may be used interchangeably with 2-(pyridine-2-yl)disulfanamine, 2-(pyridin-2-yldisulfanyl) ethanamine, 2-(2-pyridyldithio) ethylamine and/or PDEA.

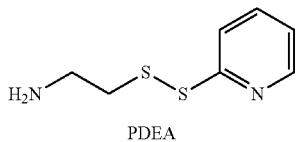 [SMILES: NCCSSc1ccccn1]

PDEA

In certain contexts herein, the term "PDEA" may also be used more generally to refer to a chemical structure comprising a moiety according to Formula A. PDEA is known to react with thiol containing nucleophiles such as cysteine whereby the disulfide bond of the PDEA is broken when the sulfur linked to the PDEA pyridine ring is replaced by the sulfur of the nucleophile thiol group. As a result, a compound including —S—(CH$_2$)$_2$—NH$_2$ from the PDEA is formed as well as pyridine-2-thiol. This is illustrated in Scheme 1 below, where the nucleophile R—SH is reacted with PDEA.

Scheme 1

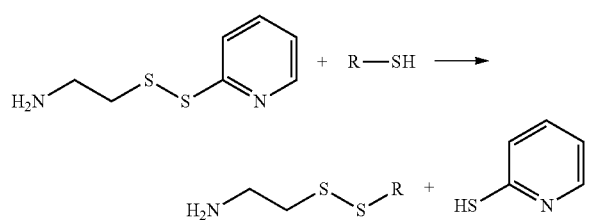

In the same way, the reaction of a thiol containing nucleophile with PDEA has been used in e.g. applications where the amino group of the PDEA is covalently bonded to a carbonyl group of a polymer which in turn is bonded such as covalently bonded to the surface of a substrate such as a medical device. This is illustrated in Scheme 2 where the circle stands for a surface such as a medical device surface, Z stands for a polymer and the carbonyl group is part of the polymer.

Scheme 2

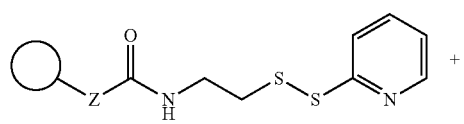

-continued

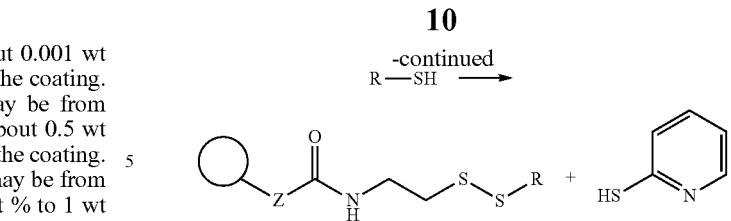

For example, WO 2006/101438 A1 describes such a reaction using cysteine or cysteine analogues as thiol containing nucleophiles which results in surfaces with excellent antimicrobial properties.

Biofilm Prevention or Mitigation

In the present context, the term biofilm refers to a complex, three-dimensional structure on a surface (such as a medical device) formed by communities of microorganisms (bacteria, fungi, or protists) that are embedded in self-produced, extracellular polymeric substances (EPS). The formation of a biofilm protects the microorganisms and makes them difficult to eradicate and may significantly influence the pathogenicity of the microbes. Biofilm formation is a multi-step process that involves attachment, EPS production and maturation of the biofilm.

The terms prevention and mitigation in the context of biofilm formation or/and growth refers to any degree of reduction in the formation of a biofilm, including a minor, substantial or major reduction in the formation of a biofilm as well as total prevention. Preferably, the degree of reduction is at least a minor reduction. The degree of reduction may be at least about 10%, at least about 20%, at least about 30%, at least about 40%, at least about 50%, at least about 60%, at least about 70%, at least about 80%, at least about 90% or about 100%. For example, the degree of reduction may be between about 10% and about 100%, such as between about 20% and about 100%, between about 40% and about 100%, between about 60% and about 100%, between about 80% and about 100%, between about 20% and about 40%, between about 20% and about 60%, between about 20% and about 80%, between about 20% and about 100%, between about 40% and about 60%, between about 40% and about 80%, between about 40% and about 100%, between about 60% and about 80%, between about 60% and about 100%, or between about 80% and about 100%. An "antibiofilm effect" refers to mitigation of formation and/or growth of biofilm.

The present invention is based on the unexpected finding that mitigation of formation and/or growth of biofilm on surfaces such as surfaces of medical devices may be achieved by covalently bonding the PDEA or other moiety according to Formula A to a polymer which in turn is bonded such as covalently bonded to a surface of a medical device. Alternatively, the PDEA or other compound containing a moiety according to Formula A can be non-covalently (such as ionically) associated with the polymer.

Thus, no reaction of the PDEA or the moiety according to Formula A with a further chemical compound is required to achieve the mitigation of formation and/or growth of biofilm. A possible chemical structure of the thus functionalized surface is shown by Formula I, where the circle and Z have the meanings described herein and the carbonyl group is part of the polymer.

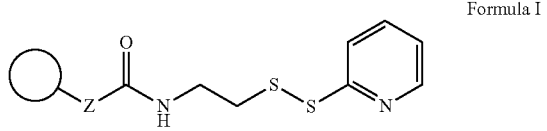

Formula I

In particular, it has been found that the amount of moiety of Formula A may be low such as provided in an amount as described herein and yet allow for the mitigation of formation and/or growth of biofilm on a medical device surface. At low amounts, the coating does not have a bacteriostatic or bactericidal effect, yet the antibiofilm effect prevents fouling of the medical device.

Of course, the use of PDEA or other structure comprising Formula A as the only anti-biofilm agent and in a low amount is a significant benefit since it simplifies manufacturing and/or minimizes use of chemicals. Additionally, the use of a low amount of structure according to Formula A that is covalently or non-covalently bound to the polymer minimizes the risk of toxicity. As shown herein, testing of the coating has shown no cytotoxicity. Thus, there is no or minimal release of the PDEA (or other compound comprising the structure according to Formula A) in an amount providing a therapeutic effect. This in turn simplifies regulatory processes for medical devices with the coating.

It will be appreciated that the biofilm comprises microorganisms such as bacteria. The bacteria may be Gram-positive and/or Gram-negative bacteria. For example, the bacteria may involve one or more of the following bacteria: Enterococcus faecalis, Staphylococcus aureus, Staphylococcus epidermidis, Streptococcus viridans, Enterococcus faecium, Enterococcus faecium, Streptococcus spp, E. coli, Klebsiella pneumoniae, Proteus mirabilis, Pseudomonas aeruginosa, Cinetobacter baumannii. In an example, the Gram-positive bacteria may be one or more of the following: Enterococcus faecalis, Staphylococcus aureus, Staphylococcus epidermidis, Streptococcus viridans, Enterococcus faecium, Enterococcus faecium, Streptococcus spp. In a further example, the Gram-negative bacteria may be one or more of the following: E. coli, Klebsiella pneumoniae, Proteus mirabilis, Pseudomonas aeruginosa. Additionally or alternatively, the biofilm may comprise fungi such as Candida Albicans.

It will be appreciated that the mitigation of formation and/or growth of biofilm described herein may involve minimizing, reducing and/or preventing the formation and/or growth of the biofilm. While not wishing to be bound by any specific theory it is believed that some bacteria may still adhere to the surface but without assembling into biofilms thereby making them susceptible to treatment with antimicrobial agents such as antibiotics, or simply allows them to be washed or flushed away. It is also known that microorganisms without biofilm/EPS are less likely to cause infections (i.e. are less aggressive as pathogens). Lack of biofilm also makes them more susceptible to the immune system of the body, or as well as more accessible to drug therapy.

Polymers of the Coating

The polymer (optionally covalently bonded to the moiety of Formula A) provides a coating for the surface. In the presence of water, the coating may form a hydrogel. Thus, there is provided a coating as described herein which comprises or consists of a hydrogel. As used herein, a hydrogel is a cross-linked hydrophilic polymer that does not dissolve in water.

It will be appreciated that the polymer of the coating may be bonded such as covalently bonded to the medical device surface. It is believed that this allows the coating to stay in place and increases its resistance to being worn off. Advantageously, the coated medical device of the present invention has been found to be abrasion resistant.

The functionalization of the medical device surface involves polymerization of the monomers prior to reaction with the PDEA or other compound comprising the structure of Formula A. The monomers may comprise one or more functional groups such as carboxyl groups, amino groups, halogens etc.

The monomers may be selected from the group consisting of acrylic acid, methacrylic acid, 4-vinylbenzoic acid, itaconic acid, vinylpyrrolidone, any combination(s) of the foregoing and esters or amides thereof. For example, the monomers may comprise or consist of acrylate or acrylic monomers such as acrylic acid. Accordingly, the polymer of the coating may be or comprise polyacrylic acid, polymethacrylic acid, poly-4-vinylbenzoic acid, polyitaconic acid, any combination(s) of the foregoing and esters or amides thereof. The coating may additionally comprise polyvinylpyrrolidone. In particular, the polymer may comprise an acrylate polymer or an acrylic polymer such as polyacrylic acid. For example, the polymer may comprise or consist of polyacrylic acid. It will be appreciated that for polymers comprising carboxylic acid groups the surface concentration of the carboxylic acid may range from about 1 mmol/cm$^2$ to about 30 mmol/cm$^2$, such as from about 5 mmol/cm$^2$ to about 25 mmol/cm$^2$, from about 5 mmol/cm$^2$ to about 20 mmol/cm$^2$, from about 5 mmol/cm$^2$ to about 10 mmol/cm$^2$, from about 6 mmol/cm$^2$ to about 9 mmol/cm$^2$. For instance, the surface concentration of the carboxylic acid may range from about 3 mmol/cm$^2$ to about 8 mmol/cm$^2$, from about 4 mmol/cm$^2$ to about 7 mmol/cm$^2$ or from about 5 mmol/cm$^2$ to about 6 mmol/cm$^2$. In certain embodiments, the surface concentration of the carboxylic acid groups may be about 1-20 mmol/cm$^2$, about 1-15 mmol/cm$^2$, about 1-10 mmol/cm$^2$, about 1-7 mmol/cm$^2$ or about 1-5 mmol/cm$^2$. The surface concentration of the carboxylic acid groups of about 3-7 mmol/cm$^2$ is most preferred.

The polymer of the coating may be grafted from the medical device. In this way, the polymerization will be initiated and propagated from the surface to which the resulting polymers will be covalently attached. Additionally or alternatively, the polymer may be grafted onto the surface of the medical device whereby a preformed polymer is covalently bound to the surface.

Suitable Medical Devices

The medical device described herein may be selected from the group consisting of a catheter, implant, tracheal tube, stent, ventilator, wound dressing, face mask, nasal prong, hearing aid and syringe. In a further example, the medical device may be selected from the group consisting of a central venous catheter, ureteral stent, wound dressings, ventilator, face mask, nasal prong and implant. In still a further example, the medical device may be a catheter, such as a Foley catheter, or an endotracheal tube.

The medical device described herein may comprise or consist of a polymer such as a thermoplastic and/or thermoset polymer. For instance, the polymer may comprise or consist of one or more of the following: silicone, polyethylene, polypropylene (PP), polyurethane, polyvinyl chloride (PVC), polycaprolactone, polycarbonate, rubber such as latex rubber, polyether ether ketone (PEEK). In an example, the polymer may comprise one or more of the following: silicone, polyvinyl chloride (PVC), polypropylene (PP). In a further example, the polymer may comprise or consist of silicone. In still a further example, the polymer may comprise or consist of polyvinyl chloride (PVC). In yet an example, the polymer may comprise or consist of polypropylene (PP).

Additionally or alternatively, the medical device may comprise or consist of a metal. For example, the metal may comprise one or more of the following: steel such as stainless steel, alloy such as cobalt-based alloy or nitinol, or titanium. As used herein, nitinol is an alloy comprising or consisting of nickel and titanium.

The coating of the medical device may be present on at least part of an inner surface and/or an outer surface of the medical device.

For example, it has been found that the surface of the medical device described herein may be free or substantially free from biofilm after 4 days or more of clinical use. For example, the medical device may be free from biofilm after 7, 14, 21 or 30 days of clinical use.

The coating may be provided on the medical device using known methods in the art. For example, a method as described in WO 2006/101438 A1 may be used for preparing the coated medical device described herein. However, it will be appreciated that the bonded PDEA or other structure comprising the structure of Formula A will preferably not be reacted further. For example, the medical device surface may be functionalized by polymerizing monomers such as monomers described herein from the device surface in the presence of a photoinitiator using irradiation such as electron beam irradiation, gamma irradiation, UV irradiation or gas plasma, Subsequently, the formed polymer may be reacted further with PDEA or other moiety of Formula A in the presence of a coupling agent such as 1-ethyl-3-(3-dimethylaminopropyl) carbodiimide (EDC) and N-hydroxysulfosuccinimide (Sulfo-NHS) or salt(s) thereof. Alternatively, the carboxylic acid group may be converted into an acyl chloride or an anhydride instead of using a coupling agent. This is illustrated in Scheme 3 where the circle stands for a surface such as a medical device surface, Z stands for a polymer and the carboxylic acid group is part of the polymer.

Scheme 3

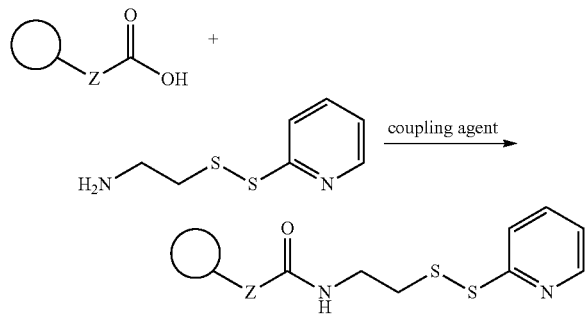

Coating for a Medical Device

In a second aspect, there is provided a coating for a medical device, the coating being as defined in the first aspect. In particular, there is provided a coating comprising a polymer of Formula II:

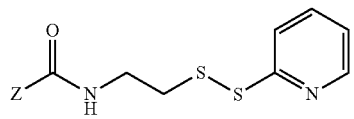

Formula II

In the compound of Formula II, Z may be a polymer as described herein. For example, Z may be an acrylate or acrylic polymer such as polyacrylic acid. Further, the carbonyl group in the polymer of Formula I may be part of the polymer Z. The polymer of Formula II may be bonded such as covalently bonded to a surface such as a surface of a medical device. For example, the polymer of Formula II may be bonded to a surface via a covalent bond from Z to the surface. The coating may further comprise water thereby so that the coating is provided as a hydrogel. The coating may be provided on a surface of a medical device as described herein.

Uses of a Coating to Prevent Biofilm Formation on a Medical Device Surface

In a third aspect, the present invention provides a use of a coating for mitigating formation and/or growth of biofilm on a medical device surface.

The coating may comprise:
polymer Z bonded to the medical device (preferably covalently) and moieties of Formula A

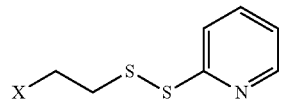

Formula A wherein X is an amino group which is covalently bonded to Z or which can ionically bind to free carboxyl groups; and wherein polymer Z is capable of forming a hydrogel when contacted with a fluid containing water, such as water, an aqueous buffer, an aqueous saline solution, or a bodily fluid including but not limited to urine, plasma, blood, wound fluid, saliva and cerebrospinal fluid.

Polymer Z may comprise free carboxyl groups. The polymer Z may preferably comprise free carboxyl groups in an amount of about 1-30 µmol/cm$^2$. In certain embodiments, the surface concentration of the carboxylic acid groups may be at least about 3 mmol/cm$^2$, about 1-20 mmol/cm$^2$, about 3-20 mmol/cm$^2$, about 1-15 mmol/cm$^2$, about 1-10 mmol/cm$^2$, about 1-7 mmol/cm$^2$ or about 1-5 mmol/cm$^2$. The surface concentration of the carboxylic acid groups of about 3-7 mmol/cm$^2$ is most preferred.

X may be a primary amino group —NH$_2$, a secondary amino group —NRH, or a tertiary amino group —NR$_2$, wherein each R is independently selected from C$_{1-4}$ alkyl. Examples of C$_{1-4}$ alkyl include methyl, ethyl, n-propyl, isopropyl, n-butyl, isobutyl, sec-butyl and tert-butyl. In some embodiments, X is a primary amino group —NH$_2$.

X may be covalently bonded to Z at terminal functional groups and/or to functional groups along the polymer backbone. Examples of such functional groups include carboxy. Alternatively, X may ionically bind to terminal free carboxyl groups or to free carboxyl groups along the polymer backbone, as discussed under the first aspect.

The coating may comprise the structure of Formula I:

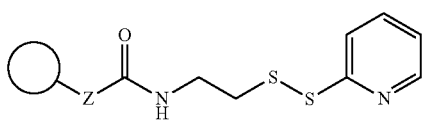

(I)

wherein the circle represents the surface of the medical device. The coating may additionally or alternatively comprise moieties of Formula A wherein X is an amino group. The coating may thus comprise the structure:

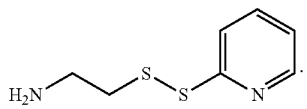

At least about 1 mol. % of the moieties according to Formula A may be attached to Z via a covalent linker, or in an increasing order of preference: at least about 2, 5, 10, 20, 30, 40, 50, 60, 70, 80, 90 or 100 mol. %, such as 2-100, 5-100, 10-100, 30-100, 50-100, 80-100, 2-90, 5-90, 10-90, 20-90, 30-90, 50-90, 80-90, 2-70, 5-70, 10-70, 30-70, 50-70, 20-80, 30-90, 40-80 mol. %. At least 1 mol. % of the moieties according to Formula A may be associated non-covalently with the coating, or in an increasing order of preference: at least about 2, 5, 10, 20, 30, 40, 50, 60, 70, 80, 90 or 100 mol. %, such as 2-100, 5-100, 10-100, 30-100, 50-100, 80-100, 2-90, 5-90, 10-90, 20-90, 30-90, 50-90, 80-90, 2-70, 5-70, 10-70, 30-70, 50-70, 20-80, 30-90, 40-80 mol. %. It is possible that both covalently and non-covalently associated moieties are present at the same time.

The moieties according to Formula A may be present in an amount of about 0.5-30 nmol/cm$^2$ in the coating. In certain embodiments, the moieties according to Formula A may be present in an amount of about 0.5-15 nmol/cm$^2$, 0.5-12 nmol/cm$^2$, about 0.5-10 nmol/cm$^2$, about 0.5-9 nmol/cm$^2$, about 0.5-8 nmol/cm$^2$, about 0.5-7 nmol/cm$^2$, about 0.5-6 nmol/cm$^2$, about 0.5-5 nmol/cm$^2$, about 0.5-4 nmol/cm$^2$. about 0.5-3 nmol/cm$^2$, about 0.5-2 nmol/cm$^2$, about 0.5-1 nmol/cm$^2$, about 1-12 nmol/cm$^2$, about 1-10 nmol/cm$^2$, about 1-9 nmol/cm$^2$, about 1-8 nmol/cm$^2$, about 1-7 nmol/cm$^2$, about 1-6 nmol/cm$^2$, about 1-5 nmol/cm$^2$, about 1-4 nmol/cm$^2$, about 1-3 nmol/cm$^2$, about 1-2 nmol/cm$^2$, or about 1 nmol/cm$^2$.

The coating may comprise polymer Z selected from the group consisting of polyacrylic acid, polymethacrylic acid, poly-4-vinylbenzoic acid, polyitaconic acid, any combination(s) of the foregoing and esters or amides thereof. The coating may additionally comprise polyvinylpyrrolidone. The polymer Z may comprise an acrylate polymer or an acrylic polymer such as polyacrylic acid. The polymer Z of the coating may be grafted from the medical device.

The coating may be as defined in the first or second aspects.

Preferably, the mitigation of formation and/or growth of biofilm does not involve a bactericidal or bacteriostatic effect.

ITEMIZED EMBODIMENTS

In certain embodiments, the present invention relates to the following items:

1. A medical device comprising a coating, said coating comprising
   2-(pyridyldithio)ethylamine (PDEA) covalently bonded to a polymer, said polymer being covalently bonded to the medical device
   wherein
   the PDEA is present in an amount of from 0.001 wt % to 35 wt % based on the total weight of the coating.
2. The medical device according to item 1, wherein the PDEA is present in an amount from 0.001 wt % to 1 wt % based on the total weight of the coating.
3. The medical device according to item 1 or 2, wherein the polymer is selected from the group consisting of polyacrylic acid, polymethacrylic acid, poly-4-vinylbenzoic acid, polyitaconic acid, polyvinylpyrrolidone, any combination(s) of the foregoing and esters or amides thereof.
4. The medical device according to any one of the preceding items, wherein the polymer comprises an acrylate polymer or an acrylic polymer such as polyacrylic acid.
5. The medical device according to any one of the preceding items, wherein the polymer of the coating is grafted from the medical device.
6. The medical device according to any one of the preceding items, wherein the coating comprises water thereby forming a hydrogel.
7. The medical device according to any one of the preceding items, wherein the medical device is selected from the group consisting of a catheter, implant, tracheal tube, stent, ventilator, wound dressing, face mask, nasal prong, hearing aid and syringe.
8. The medical device according to any one of the preceding items, wherein the medical device is selected from the group consisting of a central venous catheter, ureteral stent, wound dressing(s), ventilator, face mask, nasal prong and implant.
9. The medical device according to any one of the preceding items, wherein the medical device is a catheter, such as a Foley catheter, or an endotracheal tube.
10. The medical device according to any one of the preceding items, wherein the medical device comprises
    a polymer such as a thermoplastic and/or thermoset polymer, and/or
    a metal.
11. The medical device according to item 10, wherein
    the polymer comprises one or more of the following: silicone, polyethylene, polypropylene, polyurethane, polyvinyl chloride, polycaprolactone, polycarbonate, rubber such as latex rubber, polyether ether ketone (PEEK)
    and/or
    the metal comprises one or more of the following: steel such as stainless steel, alloy such as cobalt-based alloy or nitinol, titanium.
12. The medical device according to any one of the preceding items, wherein the coating is present on at least part of an inner surface and/or an outer surface of the medical device.
13. The medical device according to any one of the preceding items, wherein the medical device is free or substantially free from biofilm after 4 days or more, such as 30 days of clinical use.
14. A coating for a medical device as defined in any one of the preceding items.

15. Use of a coating as defined in any one of the preceding items for mitigating formation and/or growth of biofilm on a medical device surface.

The term "comprising" is to be interpreted as including, but not being limited to.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The invention will be further described by reference to the following examples, which are not intended to limit the scope of the invention.

EXAMPLES

In this document, the name "2-(pyridin-2-yldisulfanyl) ethanamine" and the chemical structure of the compound of Formula I have been generated using the program ChemDraw Ultra version 12.0.2.1076. If the drawing and the name are inconsistent, the drawing shall be considered to be correct.

Abbreviations

AUM Artificial Urine Medium
aq. aqueous
BP benzophenone
cfu colony-forming unit
$cm^2$ square centimeter(s)
DI deionize (d)
g gram(s)
NHS N-hydroxysuccinimide; CAS No: 6066-82-6T
EDC 1-ethyl-3-(3-dimethylaminopropyl) carbodiimide; CAS No: 25952-53-8
EPS Extracellular Polymeric Substances
ISO International Organization for Standardization
L liter(s)
L-Cysteine CAS No: 52-90-4
mg milligram(s)
mmol micromole(s)
min. minute(s)
ml milliliter(s)
M molar(s)
MQ MilliQ
nm nanometer(s)
nmol nanomole(s)
OD Optical Density
PAA Polyacrylic Acid; CAS No: 9003-01-4
PBS Phosphate-Buffered Saline
PDEA 2-(pyridyldithio)ethylamine; CAS no: 106139-15-5
Sulfo-NHS N-hydroxysulfosuccinimid
UV ultraviolet
wt % percent by weight The AUM used herein had the same composition as described in Letters in Applied Microbiology 1997, 24, 203-206.

Example 1: Preparation of Antibiofilm Silicone Foley Catheters

A protocol for the coating process to achieve an antibiofilm coating on catheters is described below. It will be appreciated that the protocol may be applied to a single catheter.

PAA Hydrogel
1. Catheters were washed in ethanol for 1 minute.
2. Catheters were dried at ambient temperature for 10 min.
3. Catheters were dipped in ethanol solution of the photo initiator BP (5%) followed by irradiation with UV light for 30 seconds.
4. Catheters were washed in ethanol for 30 seconds to remove excess BP.
5. An aqueous monomer solution of acrylic acid (10%) was prepared: For each litre of acrylic acid solution: DI water 900 ml, acrylic acid 100 ml, Mohr's salt (1.65 g), $Cu(NO_3)_2$ (1.65 g). The solution was de-gassed by adding a stir bar to the flask, the flask was put on a stir plate and stirred under vacuum until no more bubbles are seen. As used herein, Mohr's salt intends ammonium iron (II) sulfate.
6. Catheters were dipped in the prepared aqueous monomer solution followed by irradiation with UV light for approximately 4 min.
7. The catheters were dipped in DI water for 2×10 minutes during ultrasonic treatment.
8. The catheters were dipped in Ethanol for 60 minutes during ultrasonic treatment.
9. The catheters were dried for 30 min.

Characterisation of the Hydrogel:

The surface concentration of grafted polyacrylic acid was determined by adding a known amount of NaOH (aq.) to a piece of the catheter in a test tube followed by shaking of the test tube for 4-24 hours. The remaining NaOH (aq.) was titrated with HCl (aq), and the consumed HCl in the titration formed the basis for the calculation of the number of carboxylic acid groups. Thereafter, the number of carboxylic acid groups was divided by the surface area of the catheter piece to provide the surface concentration of carboxylic acid groups of the polyacrylic acid. It was found that surface concentrations of the carboxylic acid groups of from 1 $mmol/cm^2$ to 30 $mmol/cm^2$ could be achieved.

PDEA Coupling Process
1. An EDC/NHS solution was prepared; ratio 4:1. 0.1M/0.025M.
2. The catheters were dipped in the EDC/NHS solution for approximately 10 min.
3. The catheters were dipped in DI water for 3×15 seconds.
4. A PDEA solution was prepared in a borate buffer solution: For each 1 Litre of borate buffer solution: mix 6.18 g $H_3BO_3$ in 1 L of DI water. The pH was adjusted to 8.5 by using 1 M NaOH. 21 mg of PDEA was added to each litre of borate buffer solution and mixed in a glass flask.
5. The catheters were dipped in the PDEA solution for 10 min.
6. The catheters were dipped in DI water for 3×60 seconds.

7. The catheters were dipped in a phosphate buffer solution 1M, pH 7.4, for 6 hours.
8. The catheters were dipped in DI water for 3×1 minutes.
9. The catheters were dried at ambient temperature for at least 6 hours.

Rationale for the Amount of Bonded PDEA

In an example, the estimated loading of PDEA was 0.3 wt % based on the total weight of the coating. The rationale for this estimation is based on the fact that the ratio of EDC/NHS+PDEA to polyacrylic acid was 1:1000. In other words, one of 1000 carboxylic acid groups of the polyacrylic acid reacted with PDEA thereby providing a loading of 0.3 wt % based on the total weight of the coating, corresponding to about 6 nmol/cm$^2$.

Example 2: Testing of Formation and/or Growth of Biofilm

Silicone Foley catheter pieces were functionalized with polyacrylic acid and PDEA as described in Example 1. The catheter pieces each had a size of 2 cm (16F).

Three catheter pieces without a coating were provided as control samples. The control samples were subjected to Ethylene Oxide sterilization. The control samples were denominated Sample A.

Three catheter pieces with a coating were not subjected to sterilization. These samples were denominated Sample B.

Three catheter pieces with a coating were subjected to sterilization using ethylene oxide. These samples were denominated Sample C.

The catheter pieces of Samples A, B and C were subjected to *Klebsiella pneumoniae* bacteria as described in the protocol below.

Protocol
1. On Day 1 of the test 1 ml of freshly made AUM solution containing 10$^9$ cfu/ml of *Klebsiella pneumoniae* (AO15200) was added to the test tubes.
2. Samples were incubated at 37° C. for 7 days with, changing the AUM solution every day except for the weekend.
3. On day 8 samples were fixed as follows: a) 5 min 1% glutaraldehyde in PBS; b) 15 min 60% ethanol; c) 15 min 80% ethanol; d) drying.
4. Samples were stained in 0.04% crystal violet in water solution for 5 min. followed by rinsing in MQ water and dried. In this way, any bacteria or biofilm present on the sample surface was/were stained.
5. Samples were transferred onto a scotch tape and photographed.
6. Crystal violet from the scotch tape pieces was dissolved in 2 ml of 95% ethanol and quantitated measuring the Optical Density using a spectrophotometer at a wavelength of 595 nm.

Following the protocol the photographs showed a clear staining for the pieces of Sample A. In contrast, the pieces of Samples B and C were substantially not stained.

Further, the results of the spectrophotometric measurement were as shown in Table 1.

TABLE 1

| Optical Density at 525 nm for the control samples of Sample A | Optical Density at 525 nm for the unsterilized samples of Sample B | Optical Density at 525 nm for the sterilized samples of Sample C |
| --- | --- | --- |
| 0.642 | 0.013 | 0.019 |
| 0.917 | 0.013 | 0.008 |
| 0.595 | 0.028 | 0.009 |

The average optical density for the Samples in Table 1 was calculated and is illustrated in FIG. 1. As shown in Table 1 and FIG. 1 the pieces of Samples B and C had significantly less staining than the pieces of Sample A.

Based on the photographs and the spectrophotometric measurements it was concluded that the formation and/or growth of biofilm was significantly reduced in the presence of the PDEA containing coating as observed for Samples B and C, respectively.

Example 3: Testing of Abrasion Resistance

In this example, the abrasion resistance of coated catheters prepared as described in Example 1 was tested. Four different test methods were used on a coated catheter or coated tube section of catheter (e.g., 6 cm length)., namely (1) Dry Pinch Test, (2) Wet Pinch Test, Gel Pinch Test and (4) Bending Test. The test method protocols were as described below.

Dry Pinch Test
Carried out on a coated catheter or coated tube section of catheter (e.g., 6 cm length).
1. Holding the coated catheter (or coated catheter section) use a dry gloved hand to gently pinch the coated catheter between forefinger and thumb. Gently rub the surface of the coated catheter longitudinally 10 times within a 4 cm area.
2. Subject the abraded coated catheter (or coated catheter section) to the Dye Test described herein and compare with a coated control (no dry abrasion) to visually assess any coating damage and resistance to mild abrasion.

Wet Pinch Test
Carried out on a coated catheter or coated tube section of catheter (e.g., 6 cm length).
1. Holding the coated catheter (or coated catheter section) use a wet gloved hand to gently pinch the coated catheter between forefinger and thumb. Gently rub the surface of the coated catheter longitudinally 10 times within a 4 cm area.
2. Subject the abraded coated catheter (or coated catheter section) to the Dye Test described herein and compare with a coated control (no wet abrasion) to visually assess any coating damage and resistance to mild abrasion.

Gel Pinch Test
Carried out on a coated catheter or coated tube section of catheter (e.g., 6 cm length).
1. Apply Lidocaine gel (or similar) liberally between thumb and forefinger of a dry gloved hand.
2. Holding the coated catheter (or coated catheter section) use the Lidocaine gel (or similar) coated gloved hand to gently pinch the coated catheter between forefinger and thumb. Gently rub the surface of the coated catheter longitudinally 10 times within a 4 cm area.

3. Following abrasion, the catheter or catheter piece should be rinsed with deionised water to remove excess gel from the surface.
4. Subject the abraded coated catheter (or coated catheter section) to the Dye Test described herein and compare with a coated control (no gel-abrasion) to visually assess any coating damage and resistance to mild abrasion.

Bending Test

Carried out on a coated catheter or coated tube section of catheter (e.g., 6 cm length).

1. Holding the coated catheter (or coated catheter section) use dry gloved hands to gently bend and twist the coated catheter 10 times.
2. Subject the coated catheter (or coated catheter section) to the Dye Test described herein and compare with a coated control (no bending or twisting) to visually assess any coating damage and resistance to bending and twisting.

Dye Test

The Dye Test described herein was performed by immersing the catheter or catheter tube section into an aqueous solution comprising crystal violet for 60 seconds. Thereafter, the catheter or catheter tube section was withdrawn from the aqueous solution and immersed into deionised water for 60 seconds followed by removal from the solution. The colour consistency, i.e. colour uniformity, was then assessed visually. Coated areas will be dyed a purple/dark blue colour, whereas uncoated areas will not absorb dye and hence, will not be coloured. The coating quality was also assessed visually to see if there was any cracking, flaking and/or delamination of the coating.

Two replicates were made for each test method.

The results were found to be as shown in Table 2.

TABLE 2

| Example No. | Test method | Colour | Coating quality |
|---|---|---|---|
| 1 | Dry Pinch Test | Homogeneous, smooth, and purple. | No cracking, no flaking. |
| 2 | Wet Pinch test | Homogeneous, smooth, and purple. | No cracking, no flaking. |
| 3 | Gel Pinch Test | Homogeneous, smooth, and purple. | No cracking, no flaking. |
| 3 | Bending test | Homogeneous, smooth, and purple. | No cracking, no flaking. |

As shown in Table 2, the coating did not wear off in the tests. It was concluded that the coated medical devices described herein such as the catheters described herein are abrasion resistant. Thus, the coating of the medical devices described herein resists being worn off such as worn off during use.

Example 4: Cytotoxicity Test

A piece of a catheter produced in accordance with Example 1 was subjected to an MTT cytotoxicity test in accordance with the ISO standard ISO 10993-5:2009. MTT is the salt 3-(4,5-dimethylthiazol-2-yl)-2,5-diphenyltetrazolium bromide. In this test, yellow water-soluble MTT is metabolically reduced in viable cells to a blue-violet insoluble formazan. The number of viable cells correlates to the colour intensity determined by photometric measurements after dissolving the formazan in alcohol. No cytotoxicity was observed when the piece of catheter was subjected to the MTT test.

Example 5: Determination of PDEA Amount in Coating

To estimate the amount of bound PDEA in the coated catheter made in Example 1, L-cysteine was added to coated samples in solution. When L-cysteine reacts with PDEA, 2-mercaptopyridine is released and can be measured by UV spectrophotometry (342 nm), see Scheme A below.

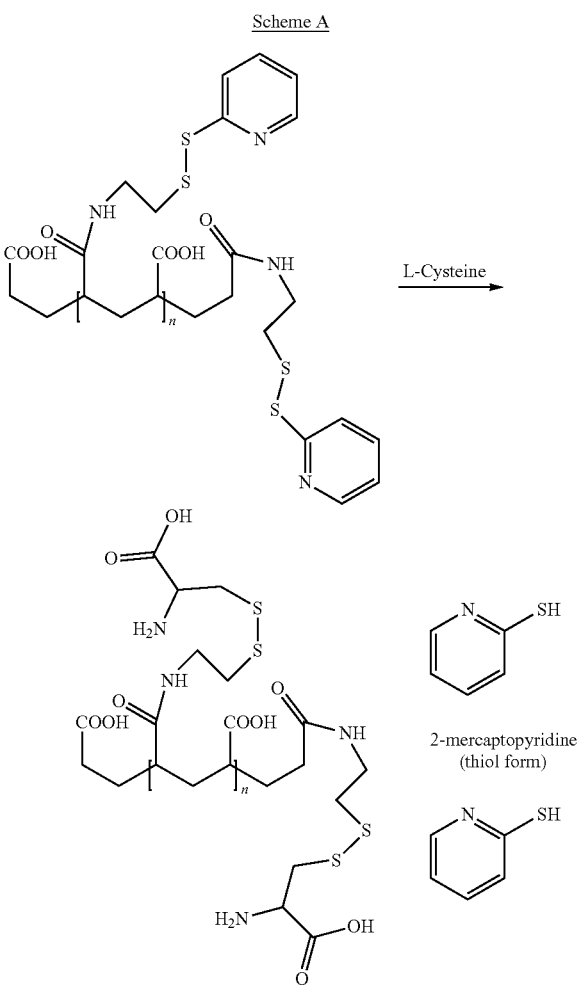

Scheme A

As long as the above reaction is complete, i.e., all PDEA reacts with L-cysteine, the amount of released 2-mercaptopyridine represents the PDEA amount present in the coating. The reaction will occur similarly even when PDEA is non-covalently (e.g. ionically) bound (scheme not shown).

To guarantee a complete reaction, new L-cysteine solution was added incrementally every 10 minutes until no additional 2-mercaptopyridine was detected whereby the reaction was deemed complete:

1. Coated samples were prepared from FR-16 size coated catheters. Two 5 cm catheter pieces were cut in half, to have four samples with a total coated area of 13.5 $cm^2$/sample.
2. A solution of 100 ml L-Cysteine (0.072 M) was prepared.

3. 5 ml L-cysteine solution was added to the samples and the reaction started.
4. The L-cysteine solution was removed after 10 minutes and 2-mercaptopyridine was measured on UV at 342 nm.
5. Step (3) and (4) were repeated until no more 2-mercaptopyridine could be detected.

Figure 2:
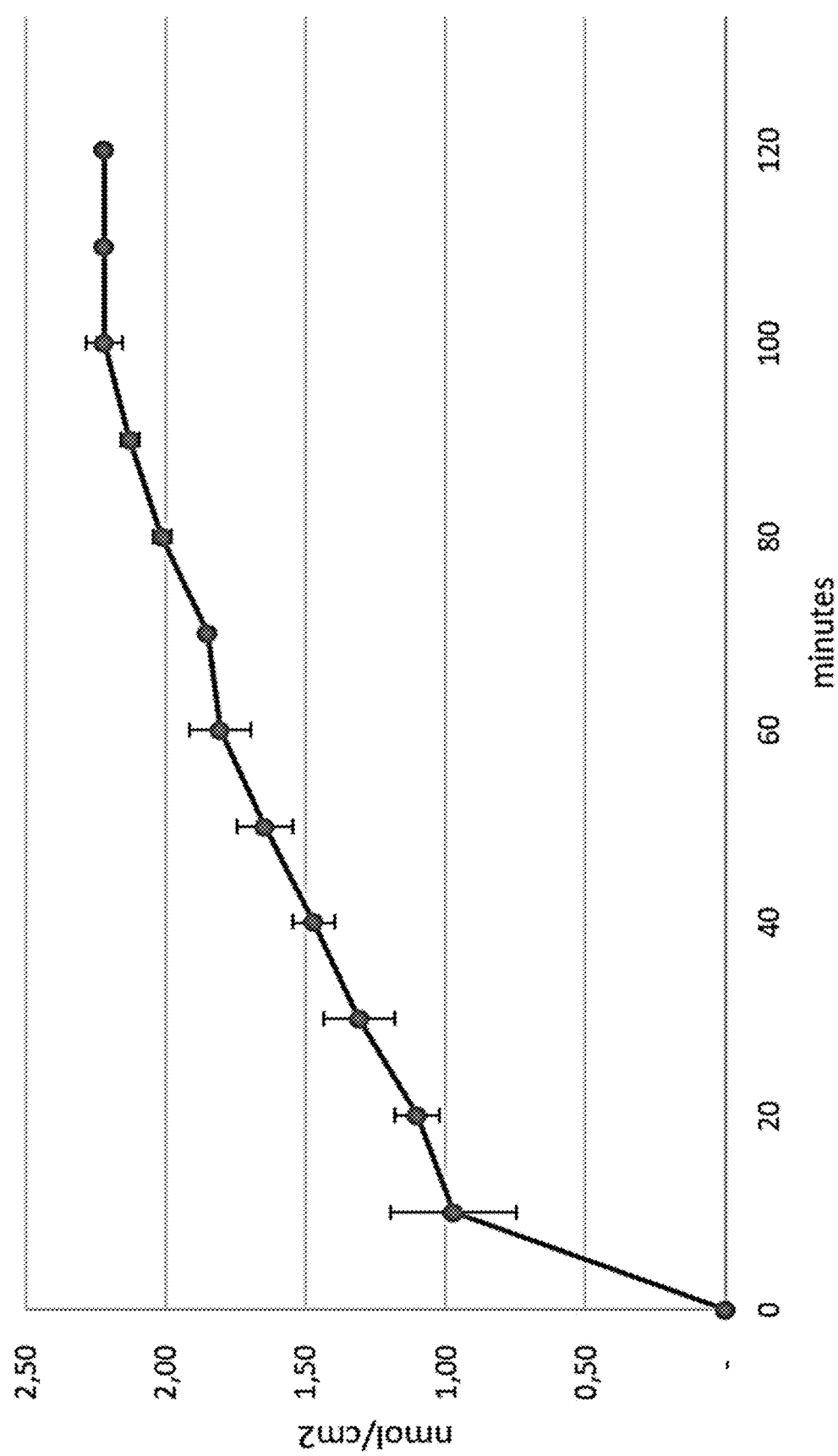
FIG. 2 shows the cumulative amount of measured 2-mercaptopyridine, and thus, amount of PDEA in the coating measured in Example 5.

The cumulative amount of measured 2-mercaptopyridine, and thus, reacted PDEA, is shown in FIG. 2.

In total, 12 successive rounds of 10 minutes coupling reactions were performed. The total PDEA amount present in the coating was determined to be 2.22 nmol/cm$^2$. Approximately, half of the total PDEA (1 nmol/cm$^2$) reacted with L-cysteine during the first 10 minutes and no additional 2-mercaptopyridine was detected after 10 rounds of couplings.

Reference Example 6: Determination of PDEA Amount in Coating of Earlier Generation Product The previous coating specification was applied applied to the type of silicone nasal prong used in the first-in-man study (Odeberg et al, supra). The objective of this experiment was to measure the amounts PDEA and Cysteine ligand present in the earlier generation coating.

The main component of the previous coating was polyacrylic acid. In the previous coating, free-radical electron beam (EB) induced polymerization was used instead of UV-induced polymerization used in the above examples.

The amount of PAA in the previous coating was approximately ~4-15 µmol/cm$^2$.

PDEA was covalently bonded to the surface according to a method similar to Example 1, except that higher concentrations EDC/NHS and PDEA were used.

After PDEA coupling, a cysteine ligand was coupled according to Scheme B:

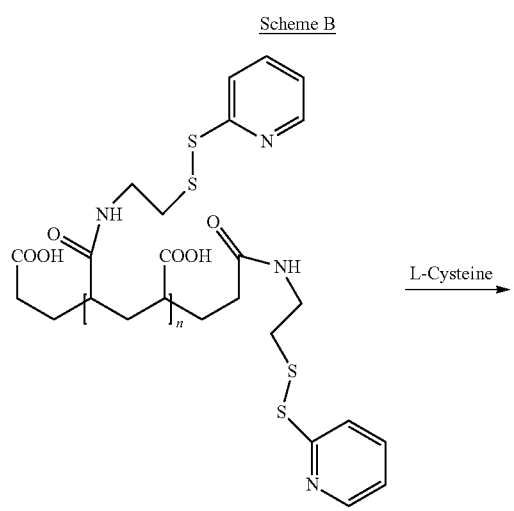

Scheme B

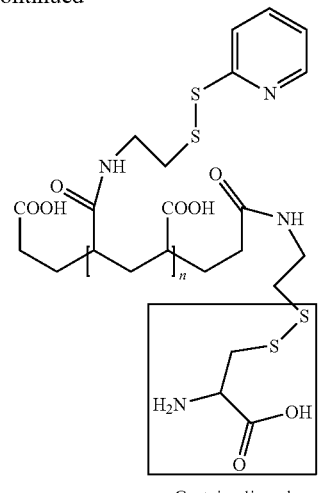

Cysteine ligand

A method similar to Example 5 was utilized to determine the amount of unreacted PDEA remaining (with the exception that 18 successive rounds of coupling reactions were performed).

Figure 3:
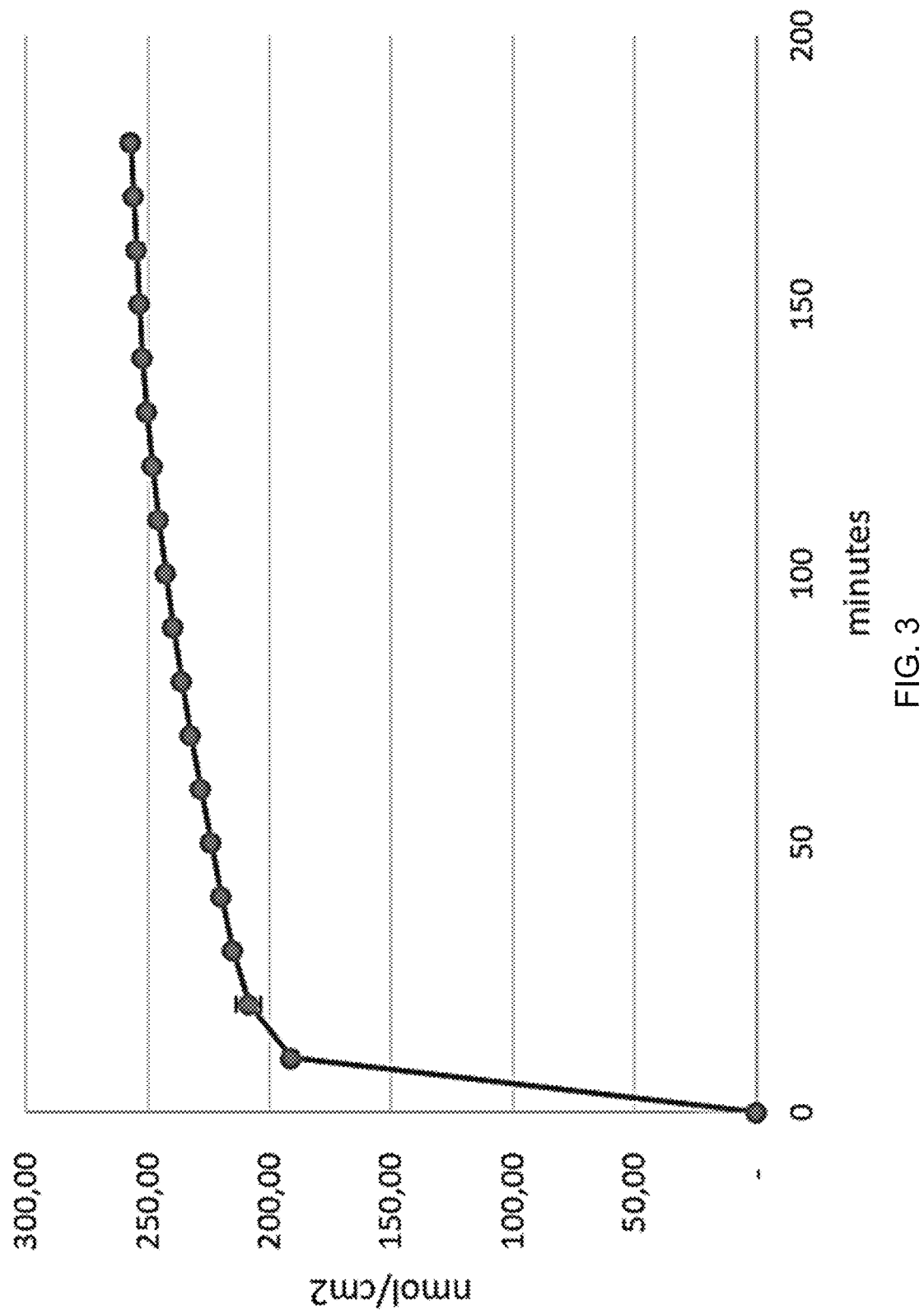
FIG. 3 shows the cumulative amount of measured 2-mercaptopyridine, and thus, amount of PDEA in the coating measured in Reference Example 6.

For the PDEA coupled intermediate, the cumulative amount of measured 2-mercaptopyridine, and thus, reacted PDEA, is shown in FIG. 3.

The 10-minute data point represents the manufacturing procedure. Thus, due to the high amount of PDEA and a relatively short L-cysteine reaction (10 minutes), not all PDEA was consumed in the previous coating process. The previous coating therefore contained both covalently bonded PDEA and Cysteine ligand.

As seen from FIG. 3, the total amount of PDEA ligand coupled in the manufacturing process was about 257 nmol/cm$^2$.

Figure 4:
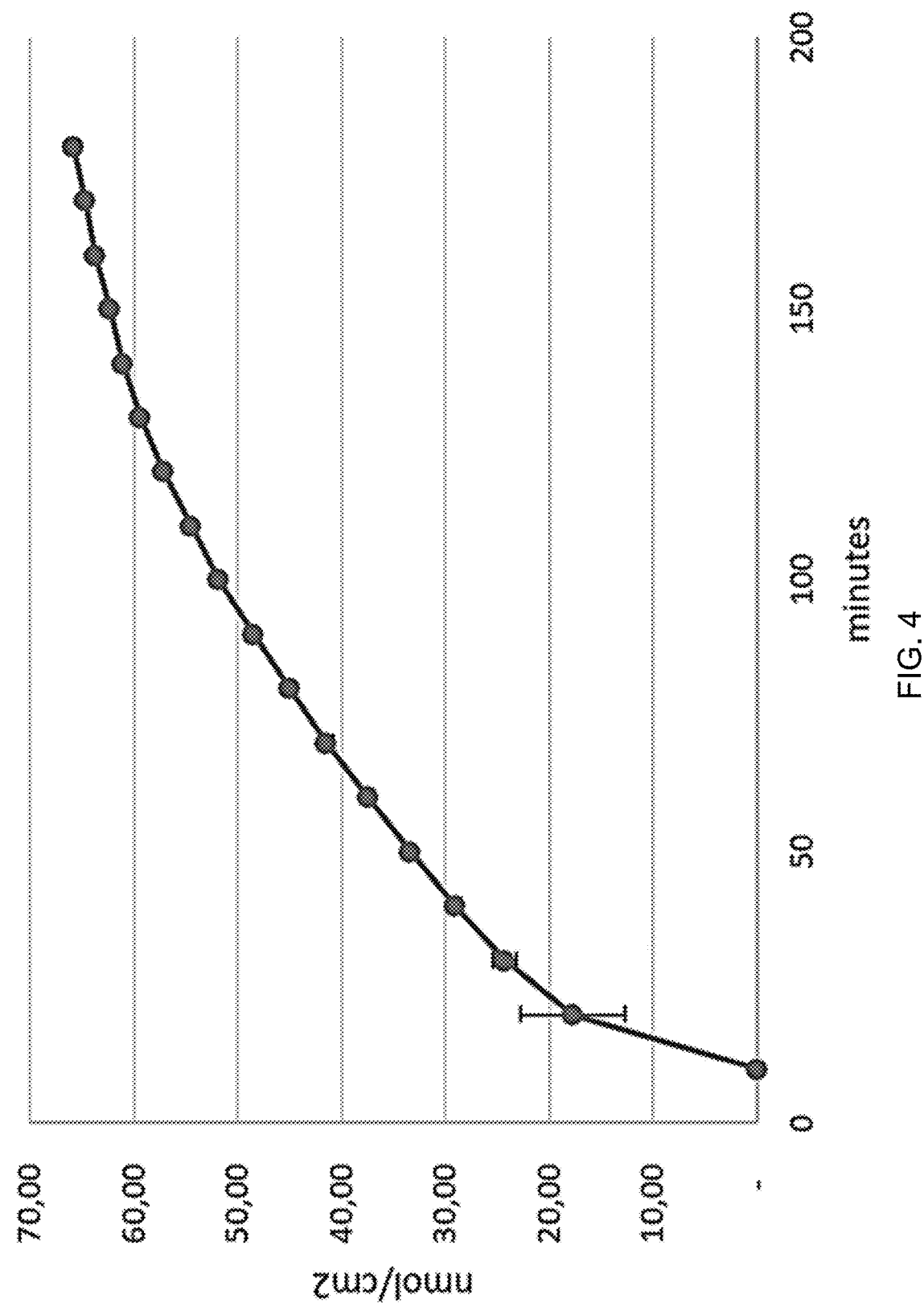
FIG. 4 is an enlarged view of cycle 2 and onwards as shown in FIG. 3, using cycle 1 as baseline. This indicates the amount of PDEA remaining in the previous generation product after coupling with the cysteine component (which corresponds to the situation after 1 cycles of coupling).

After the first 10-minute cysteine coupling, the cumulative amount of measured 2-mercaptopyridine, representing unreacted PDEA, is shown in FIG. 4. Based on the results, the remaining amount of PDEA ligand after completion of the manufacturing process was estimated to be at least about 65 nmol/cm$^2$.

In summary, the previous coating contained approximately 74% (191 nmol/cm$^2$) cysteine ligand and 26% PDEA (66 nmol/cm$^2$).

Compared to the coating of Example 1, the previous coating contained at least 25 times more bonded PDEA, i.e., >65 nmol/cm$^2$ compared to 2.2 nmol/cm$^2$.

Example 7: Dose-Response for Various PDEA Amounts

The objective of this experiment was to determine the dose-response curve for different levels of bonded PDEA in the coating. The PDEA limit for which the coating inhibits bacterial growth is of particular interest since the mode of action changes; from a biofilm preventing coating not relying on bacterial growth inhibition (present invention) to the previous "bacterial growth inhibiting" coating specification.

Silicone coated catheters size Fr14 were PAA grafted, and samples were cut into 2.5 cm pieces. Titration determined the amount of PAA to ~6.5 µmol/cm$^2$ (see Example 1).

Coupling was performed as in Example 1 using the same EDC/NHS concentration but with different PDEA concentrations. The amount of bonded PDEA was determined by UV (342 nm) measuring released 2-mercaptopyridine after reacting the samples with L-cysteine (see Example 5 for method description). Results are shown in the following table:

| Control (uncoated) | S5 | S4 | S3 | S2 | S1 |
|---|---|---|---|---|---|
| 0 nmol/cm² | 6 nmol/cm² | 13 nmol/cm² | 39 nmol/cm² | 77 nmol/cm² | 154 nmol/cm² |

Antibacterial Assay—Ahearn Test

Bacterial strain: *Escherichia coli* CFT073
Start inoculum: $15 \times 10^5$ CFU/ml
Medium: Artificial Urine Medium (AUM)
Triplicates were used for each tested sample The Ahearn test procedure was used to determine colony forming units of bacteria on the surface and in the AUM after 3 hours incubation with bacteria.

1. Test sample (2.5 cm, Fr14, total surface area 5.8 cm²) was incubated in a Phosphate buffer overnight, ambient, slow rotating.
2. The test specimens were placed in 2 ml tube.
3. 2 ml of AUM with *E. coli* ($15 \times 10^5$ CFU/ml) was placed inside the tube.
4. These were incubated for 3 hours at $37 \pm 2°$ C.
5. Samples taken for the dilutions.
6. Samples were washed with 2×2 ml of PBS to remove loosely adhering bacteria: the bacterial suspension was discarded.
7. After the wash, samples were placed in a new 2 ml microcentrifuge tube.
8. To recover adhered bacteria: 1 ml PBS with 0.05% Tween-20 was added to each tube, tubes were vortexed for 30 seconds followed by sonication for 5 min (40 kHz in an ultrasound bath, Bransonic, with a power output of 100 W at ambient conditions), and vortexed again for 30 seconds.
9. Serial dilutions were prepared in PBS, spread with glass beads and plate count on LA plates. The dilutions 0, −10, −100 were plated.

Figure 5:
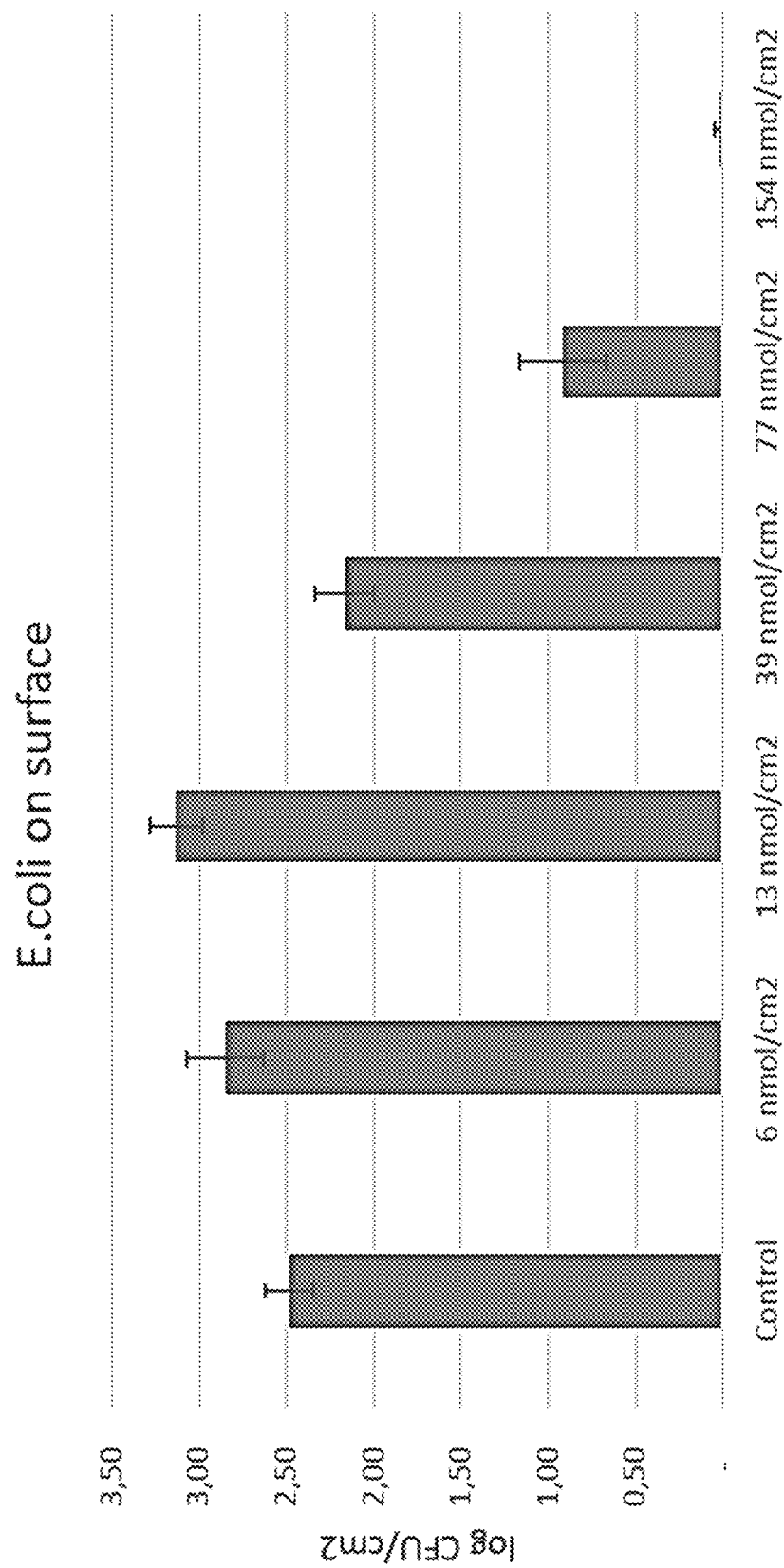
FIG. 5 shows the count of adhered bacteria present on the surface of the sample expressed in log CFU/cm². It can be seen that at low concentrations, there is no effect on bacterial numbers.
Figure 6:
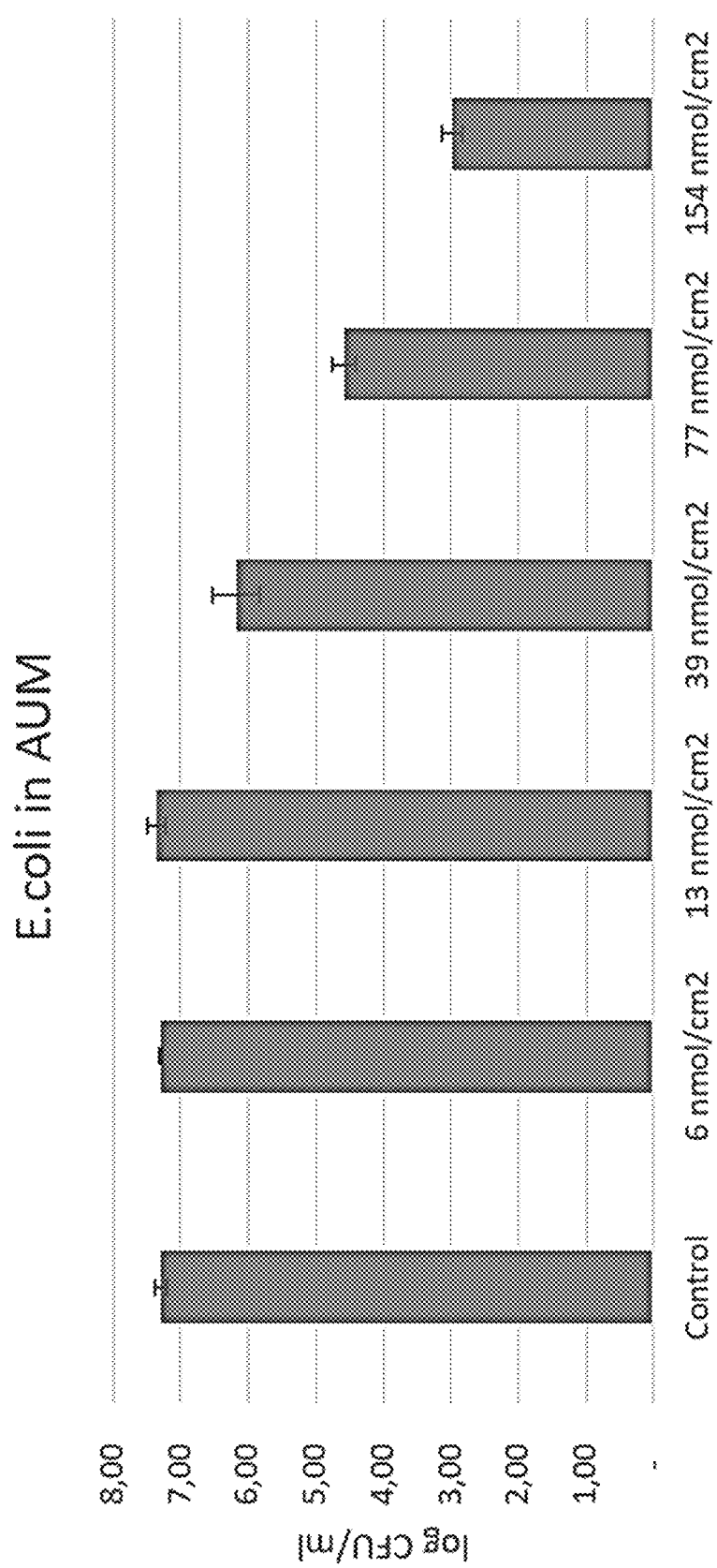
FIG. 6 shows the count of bacteria in the Artificial Urine Medium (AUM) expressed in log CFU/ml. It can be seen that at low concentrations, there is no effect on bacterial numbers.

Results are shown in FIGS. 5 (adhered bacteria) and 6 (bacteria in medium). There dose-response relationship demonstrating a clear inhibition of bacteria both on the catheter surface and in the artificial urine medium (AUM) starting in the range above 30 nmol/cm². In contrast, lower bonded amounts of PDEA have no inhibitory effect on bacterial growth. On the contrary, there are actually slightly higher numbers of adherent bacteria on both the 6 nmol/cm² and the 13 nmol/cm² samples compared to control.

The half-maximal inhibitory concentration (IC50) values for bonded PDEA were estimated and occur at 39 nmol/cm² on the surface and 30 nmol/cm² in AUM (interpolated values).

The log reduction for 77 nmol/cm² bonded PDEA is 1.55 log CFU/cm² and 2.77 log CFU/ml which is consistent with the earlier patent application (WO 2006/101438 A1) and the estimated amount of bonded PDEA in the prior art coating (more than 65 nmol/cm²).

In conclusion, the "no bacterial growth inhibition" range for bonded PDEA is defined as less than 30 nmol/cm².

Example 8: No Metabolic Nor Pharmacologic Action by the Inventive Coating

The objective with this experiment was to demonstrate that the inventive coating (termed CytaCoat herein) has no metabolic nor pharmacologic action on bacteria. The following gram-positive and gram-negative bacteria were included in the test.

*Klebsiella pneumoniae* AO15200 (clinical isolate)
*Staphylococcus epidermidis* Se19 (clinical isolate)

Uncoated and coated samples from a Silicone size Fr20 catheter were used in the test:

Untreated catheter, 2 cm pieces ("Control")
CytaCoat catheter samples, 2 cm pieces ("Cytacoat").

The "CytaCoat" material was manufactured as described in the foregoing examples and therefore had about 2.2 nmol/cm² of PDEA in the coating.

Figure 9:
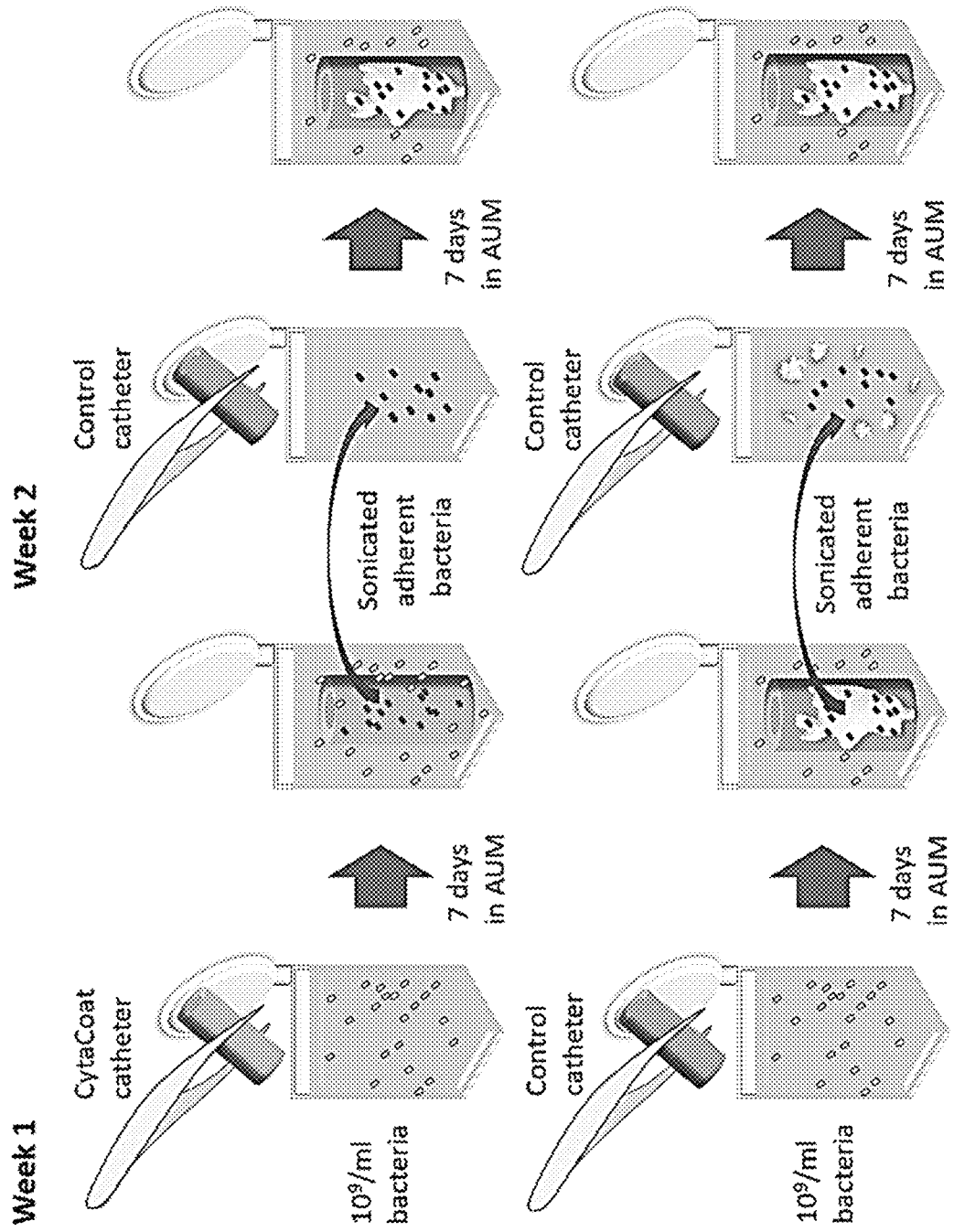
FIG. 9 illustrates experimental setup for Example 8.

The setup of the experiment is illustrated in FIG. 9.

Figure 7:
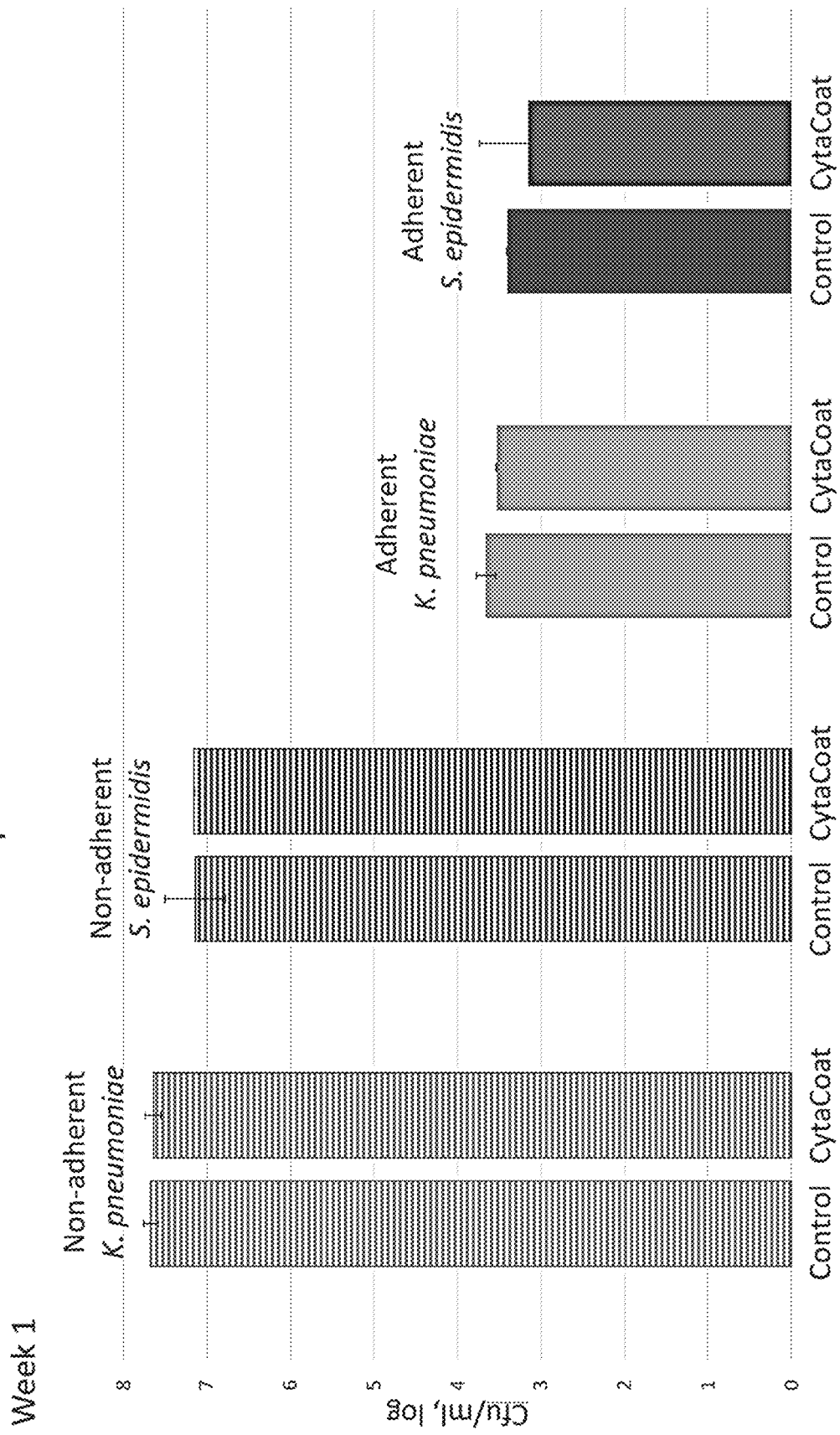
FIG. 7 shows the count of bacteria in the Artificial Urine Medium (AUM) and on catheter surface expressed in log CFU/ml. It can be seen that the coating has no effect on bacterial counts in solution, showing that there is no bacteridical or bacteriostatic effect (CytaCoat denotes coating of the present invention.)
Figure 8:
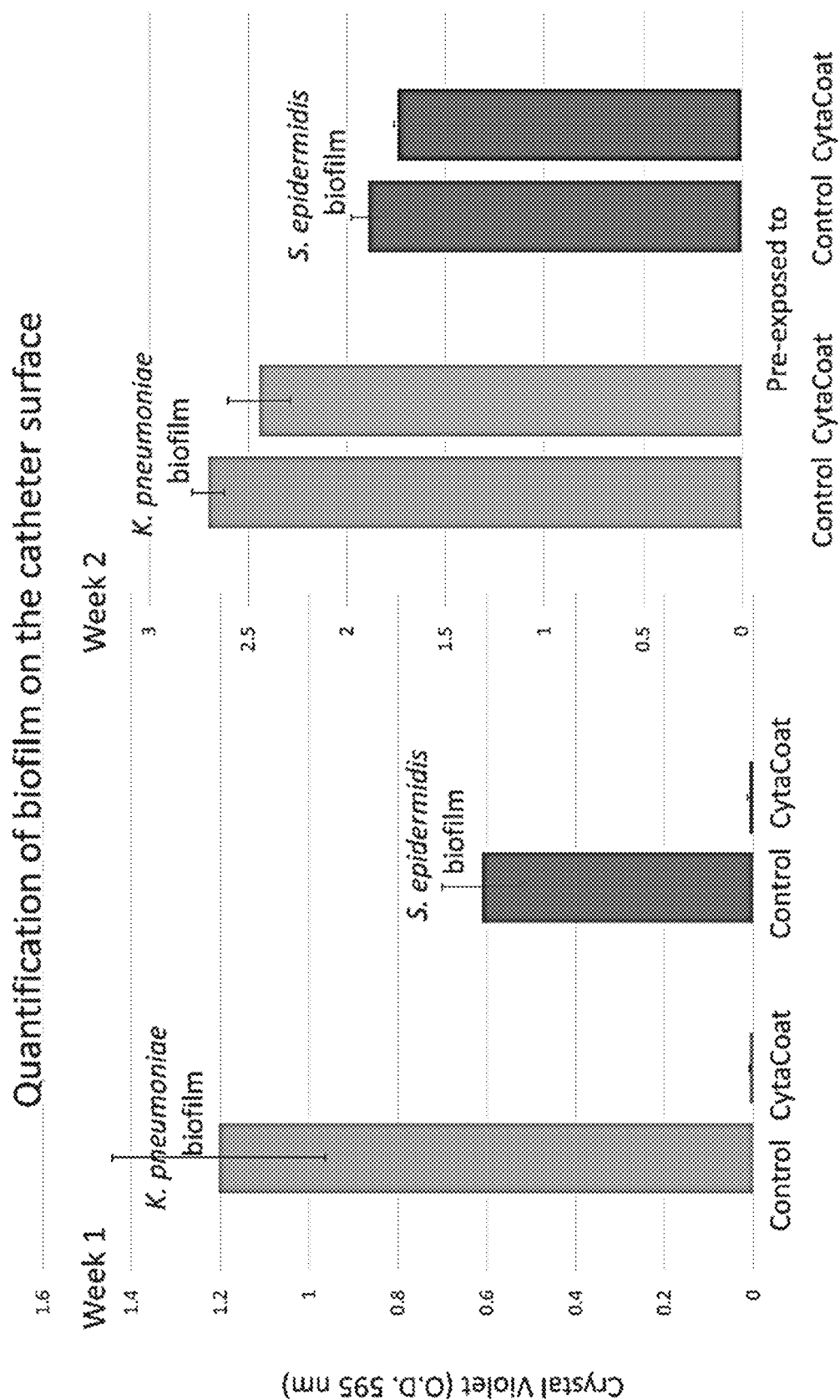
FIG. 8 shows quantification of biofilm on catheter surface. The inventive coating (denoted "CytaCoat") almost completely prevents biofilm formation during week 1 (right panel). When bacteria from week 1 are contacted with control catheters, they are still able to form a biofilm during week 2 (left panel), showing that exposure to the inventive surface had not changed their properties.

Week 1:

1. 6× catheter control and 6× CytaCoat catheter samples were used in the experiment.
2. On the Day 1 of the test 1 ml of freshly made Artificial Urine (AUM) solution containing $10^9$ cfu/ml of *K. pneumoniae* or *S. epidermidis* cells was added to the tubes.
3. Samples were incubated at 37° C. for 7 days, the AUM was changed every day except for weekends.
4. When the AUM was changed, samples were washed twice in 1.5 ml of PBS in new microcentrifuge tubes and transferred into 1.5 ml of fresh AUM in a new microcentrifuge tube.
5. On day 8, 3 samples were taken for crystal violet biofilm quantification. They were fixed as following: a) 5 min 1% glutaraldehyde in PBS; b) 15 min 60% ethanol; c) 15 min 80% ethanol; d) drying.
6. These samples were stained in 0.04% crystal violet in water solution for 5 min followed by rinsing in Milli Q water and dried. Biofilm was removed with a clean cotton swab, crystal violet extracted with 1.5 ml of 95% EtOH for 3 h and OD595 nm was measured (FIG. 8).
7. From the tubes containing another 3 samples aliquots were taken for serial dilutions and colony counting assessing colony forming units in the liquid culture (FIG. 7).
8. Those samples were washed twice in 1.5 ml of PBS in new microcentrifuge tubes and transferred into 1.5 ml of fresh AUM in a new microcentrifuge tube. Biofilm from these samples was removed and broken with 30 sec treatment with" Handheld Ultrasonic Homogenizer mixer cell disruptor cell sonicator. Aliquots were taken for serial dilutions and colony counting assessing colony forming units on the catheter (FIG. 7).
9. Resulted biofilm bacteria in AUM were transferred to fresh Eppendorf tubes all containing control catheter pieces and experiment continued for another week (see below Week 2).

Week 2:

10. Samples from the previous week experiment were incubated at 37° C. for 7 days with changing AUM every day except for weekends.
11. On day 15, 2 samples were taken for the crystal violet biofilm quantification procedure. They were fixed as following: a) 5 min 1% glutaraldehyde in PBS; b) 15 min 60% ethanol; c) 15 min 80% ethanol; d) drying.
12. These samples were stained in 0.04% crystal violet in water solution for 5 min followed by rinsing in Milli Q water and dried. Biofilm was removed with a clean cotton swab, crystal violet extracted with 1.5 ml of 95% EtOH for 3 h and OD595 nm was measured (FIG. 8).
13. 1 sample of control and CytaCoat was selected for microscopic visualization. Sample pieces were stained with Ebba Biotech Red (680 nm)/Concanavalin A-Alexa probe the following way:
a) Working solution of the dyes was made the following way: 1 µl of Ebba Biolight Red (630 nm) and 1 µl of Concanavalin A, Alexa Fluor™ 594 Conjugate (50 µg/ml).
b) Sample pieces were placed into 1 ml of dying solution and incubated for 30 min at room temperature in the dark.
c) After the staining sample pieces were briefly rinsed in water and additionally washed in 1 ml of water in the dark.
d) After staining pieces were visualized in the fluorescent microscope.

DISCUSSION

After the first week, both *K. pneumoniae* and *S. epidermidis* formed EPS/biofilm on the control whereas the CytaCoat catheter samples showed almost no detectable biofilm. After week 2, when the pre-exposed bacteria from the first week were transferred to control catheters, they formed even more EPS/biofilm compared to week 1. The biofilm formation on control surface week 2 was independent of whether the bacteria were exposed to the CytaCoat catheter or the control catheter during week 1.

CONCLUSION

The CytaCoat surface does not impede *K. pneumoniae* AO15200 or *S. epidermidis* Se19 growth, while preventing normal biofilm formation. In addition, bacteria growing on CytaCoat surface do not show change in their properties and remain capable of forming biofilms when transferred to control silicone catheter surfaces.

The results indicate that the CytaCoat coating creates a local anti-biofilm environment and that it does not have any metabolic nor pharmacologic ancillary action on the bacteria.

REFERENCES

1. WO 2006/101438 A1
2. Letters in Applied Microbiology 1997, 24, 203-206
3. Jacob Odeberg, Anders Wirsén, Åke Norberg, Jakob Frie, Gordana Printz, Hugo Lagercrantz, Gudmundur H Gudmundsson, Birgitta Agerberth, Baldvin Jonsson; A novel cysteine-linked antibacterial surface coating significantly inhibits bacterial colonization of nasal silicone prongs in a phase one pre-clinical trial. Mater Sci Eng C Mater Biol Appl 2018 Dec. 1; 93:782-789

The invention claimed is:

1. A medical device comprising a coating, said coating comprising:
polymer Z bonded to the medical device
and moieties of Formula A

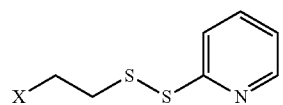

Formula A wherein X is an amino group which is covalently bonded to Z or which can ionically bind to free carboxyl groups;
wherein the moieties according to Formula A are present in the coating at an amount of 0.5-30 nmol/cm$^2$; and
wherein polymer Z comprises free carboxyl groups in an amount of 1-30 µmol/cm$^2$.

2. The medical device according to claim 1, wherein the coating comprises the structure of Formula I:

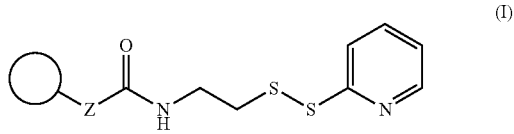

(I)

wherein the circle represents the surface of the medical device.

3. The medical device according to claim 1, wherein the coating comprises moieties of Formula A wherein X is a primary amino group —NH$_2$, a secondary amino group —NRH, or a tertiary amino group —NR$_2$, wherein each R is independently selected from C$_{1-4}$ alkyl.

4. The medical device according to claim 1, wherein the coating comprises the structure:

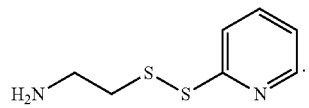

5. The medical device according to claim 1, wherein at least 20 mol % of the moieties according to Formula A are attached to Z via a covalent bond.

6. The medical device according to claim 1, wherein at least 20 mol % of the moieties according to Formula A are associated ionically with the coating.

7. The medical device according to claim 1, wherein the moieties according to Formula A are present in an amount of 0.5-15 nmol/cm$^2$ in the coating.

8. The medical device according to claim 1, wherein polymer Z comprises free carboxyl groups in an amount of 3-7 µmol/cm$^2$.

9. The medical device according to claim 1, said coating comprising 2-(pyridyldithio) ethylamine (PDEA) covalently bonded to a polymer, said polymer being covalently bonded to the medical device,
wherein the PDEA is present in an amount of from 0.001 wt % to 1 wt % based on the total weight of the coating.

10. The medical device according to claim 9, wherein the PDEA is present in an amount from 0.01 wt % to 1 wt % based on the total weight of the coating.

11. The medical device according to claim 1, wherein the polymer Z is covalently bonded to the medical device.

12. The medical device according to claim 1, wherein the coating comprises a polymer selected from the group consisting of polyacrylic acid, polymethacrylic acid, poly-4-vinylbenzoic acid, polyitaconic acid, any combination(s) of the foregoing and esters or amides thereof.

13. The medical device according to claim 1, wherein the polymer Z comprises an acrylate polymer or an acrylic polymer.

14. The medical device according to claim 1, wherein the polymer Z of the coating is grafted from the medical device.

15. The medical device according to claim 1, wherein the medical device is selected from the group consisting of a catheter, implant, tracheal tube, stent, ventilator, wound dressing, face mask, nasal prong, hearing aid and syringe.

16. The medical device according to claim 1, wherein the medical device is selected from the group consisting of a central venous catheter, ureteral stent, wound dressing(s), ventilator, face mask, nasal prong, and implant.

17. The medical device according to claim 1, wherein the medical device is selected from the group consisting of a catheter, a Foley catheter, and an endotracheal tube.

18. The medical device according to claim 1, wherein the medical device comprises a polymer and/or a metal.

19. The medical device according to claim 18, wherein:
the polymer comprises one or more of the following: silicone, polyethylene, polypropylene, polyurethane, polyvinyl chloride, polycaprolactone, polycarbonate, rubber, latex rubber, or polyether ether ketone (PEEK), and/or
the metal comprises one or more of the following: steel, stainless steel, alloy, cobalt-based alloy, nitinol, or titanium.

\* \* \* \* \*